US009084180B2

(12) United States Patent
Sampath et al.

(10) Patent No.: US 9,084,180 B2
(45) Date of Patent: Jul. 14, 2015

(54) SYSTEMS AND METHODS FOR TRANSMITTING AND RECEIVING DISCOVERY AND PAGING MESSAGES

(71) Applicant: QUALCOMM Incorporated, San Diego, CA (US)

(72) Inventors: Hemanth Sampath, San Diego, CA (US); Santosh Paul Abraham, San Diego, CA (US); Simone Merlin, San Diego, CA (US); Saurabh Tavildar, Jersey City, NJ (US); Junyi Li, Chester, NJ (US); Nilesh N. Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 13/706,792

(22) Filed: Dec. 6, 2012

(65) Prior Publication Data

US 2013/0155900 A1    Jun. 20, 2013

Related U.S. Application Data

(60) Provisional application No. 61/570,704, filed on Dec. 14, 2011.

(51) Int. Cl.
*H04W 48/16* (2009.01)
*H04L 12/24* (2006.01)
(Continued)

(52) U.S. Cl.
CPC ........... *H04W 48/16* (2013.01); *H04L 41/0803* (2013.01); *H04L 67/16* (2013.01); *H04W 8/005* (2013.01); *H04W 68/00* (2013.01); *H04W 8/205* (2013.01)

(58) Field of Classification Search
CPC ....... H04W 48/16; H04W 4/00; H04W 84/02; H04W 24/04; G06F 15/173; G06F 15/16; H04J 3/06; H04J 3/00; H04B 7/00; H04L 12/28; H04L 12/26
USPC .......... 370/252, 254, 350, 338, 336; 713/324, 713/320; 709/224, 228, 227, 230; 455/522
See application file for complete search history.

(56) References Cited

U.S. PATENT DOCUMENTS

2007/0097969 A1    5/2007   Regnier
2008/0123558 A1    5/2008   Chhabra
(Continued)

FOREIGN PATENT DOCUMENTS

WO    WO-2012077901 A1    6/2012

OTHER PUBLICATIONS

Buford J et al., "Sleeper: A 1-66 Power-Conserving Service Discovery Protocol", Mobile and Ubiquitous Systems: Networking & Services, 2006 Third Annual International Conference on, IEEE, PI, Jul. 1, 2006, pp. 1-10, XP031068689, ISBN: 978-1-4244-0498-8.
(Continued)

*Primary Examiner* — Jamal Javaid
*Assistant Examiner* — Wali Butt
(74) *Attorney, Agent, or Firm* — James K. O'Hare

(57) ABSTRACT

Methods, devices, and computer program products for transmitting and receiving discovery and paging messages are described herein. In one aspect, an apparatus operable in a wireless communication system includes a transmitter and receiver. The transmitter transmits a discovery packet during a first discovery interval of a plurality of discovery intervals. The discovery packet advertises a service provided in a wireless communications network, and the plurality of discovery intervals include recurring time intervals when a plurality of devices are configured to transmit and receive discovery packets. The receiver receives a paging packet from a first device during a first paging interval of a plurality of paging intervals. The paging packet indicates interest in the service, and the plurality of paging intervals include recurring time intervals when the plurality of devices are configured to transmit and receive paging packets. The plurality of paging intervals do not overlap the plurality of discovery intervals.

66 Claims, 14 Drawing Sheets

(51) Int. Cl.
*H04W 8/00* (2009.01)
*H04L 29/08* (2006.01)
*H04W 68/00* (2009.01)
*H04W 8/20* (2009.01)

(56) References Cited

U.S. PATENT DOCUMENTS

| | | |
|---|---|---|
| 2008/0298289 A1 | 12/2008 | Jeyaseelan |
| 2009/0013081 A1* | 1/2009 | Laroia et al. .................. 709/228 |
| 2009/0016250 A1 | 1/2009 | Li et al. |
| 2009/0016353 A1 | 1/2009 | Li et al. |
| 2009/0017843 A1 | 1/2009 | Laroia et al. |
| 2009/0019173 A1* | 1/2009 | Wu et al. ....................... 709/230 |
| 2009/0097428 A1 | 4/2009 | Kneckt et al. |
| 2009/0285119 A1 | 11/2009 | Horn et al. |
| 2010/0008274 A1 | 1/2010 | Kneckt et al. |
| 2010/0325459 A1 | 12/2010 | Kangude et al. |
| 2011/0051668 A1 | 3/2011 | Lee et al. |
| 2011/0059762 A1* | 3/2011 | Jones et al. .................... 455/522 |
| 2011/0142014 A1 | 6/2011 | Banerjee et al. |
| 2011/0153773 A1 | 6/2011 | Vandwalle et al. |
| 2011/0154084 A1* | 6/2011 | Vandwalle et al. ........... 713/324 |
| 2011/0161697 A1 | 6/2011 | Qi et al. |
| 2011/0258313 A1 | 10/2011 | Mallik et al. |
| 2011/0268101 A1 | 11/2011 | Wang et al. |
| 2012/0271955 A1* | 10/2012 | Deverick et al. .............. 709/227 |
| 2013/0155905 A1 | 6/2013 | Sampath et al. |

OTHER PUBLICATIONS

International Search Report and Written Opinion—PCT/US2012/069798—ISA/EPO—Feb. 27, 2013.

* cited by examiner

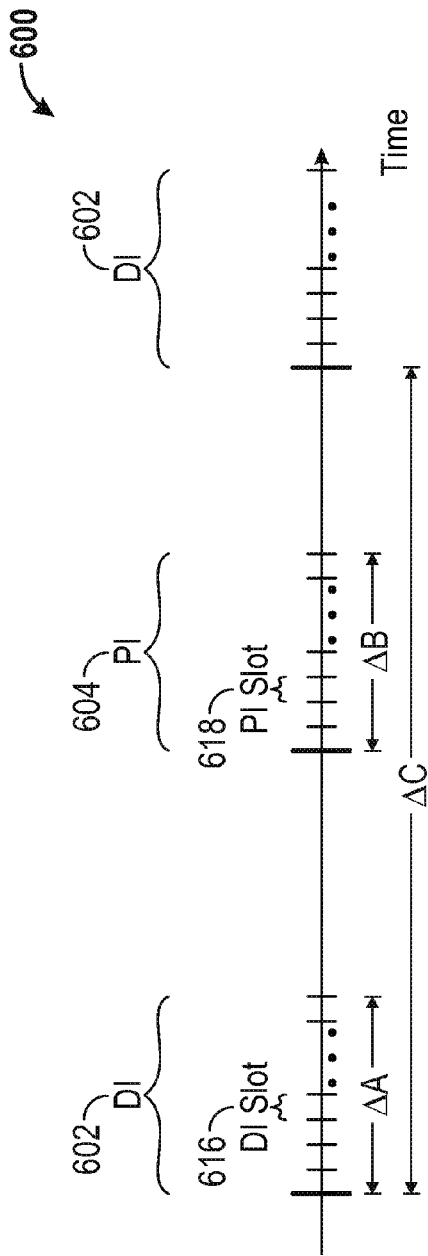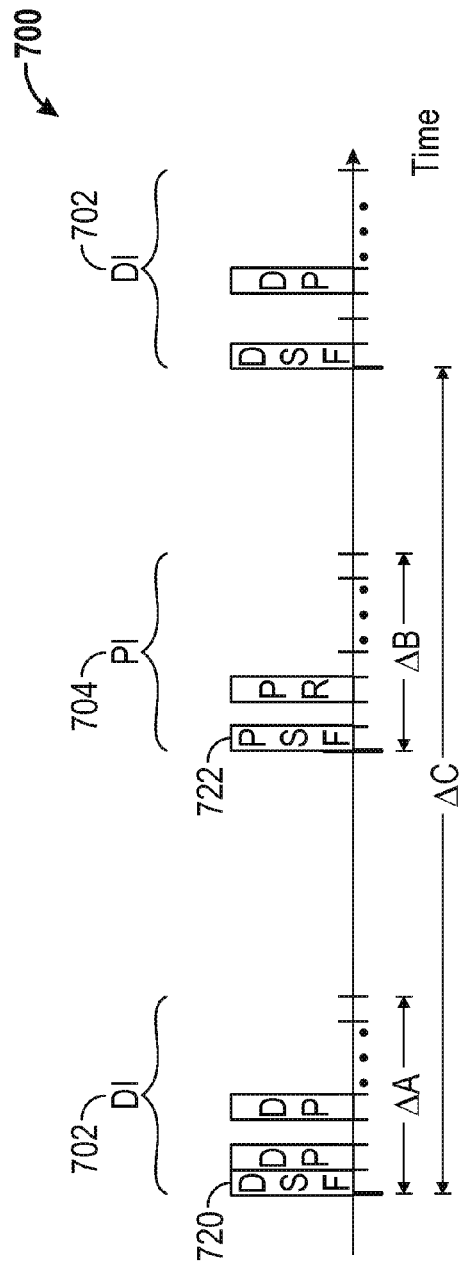

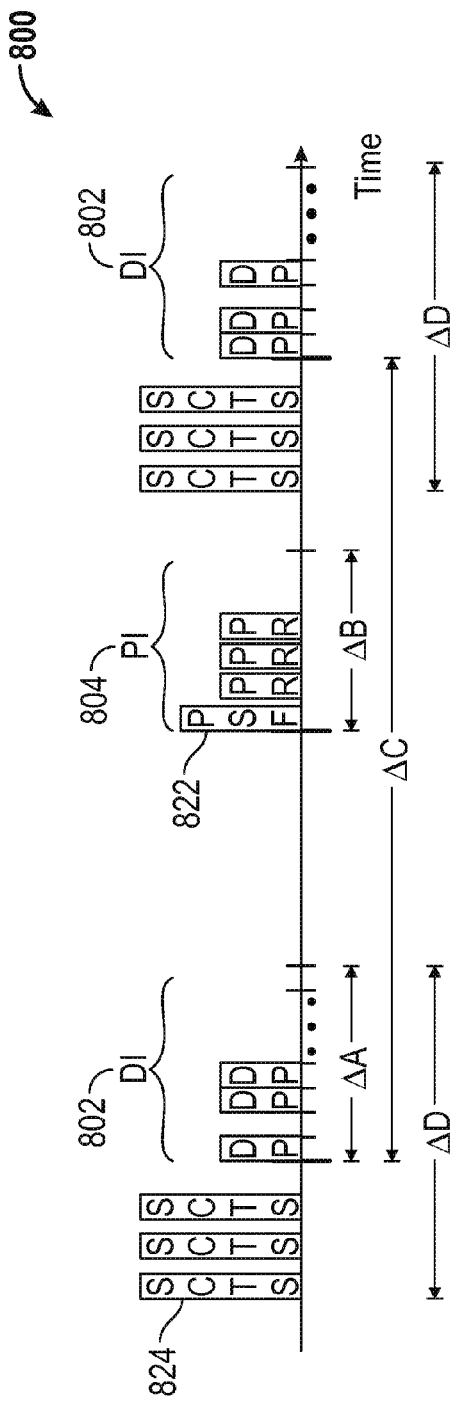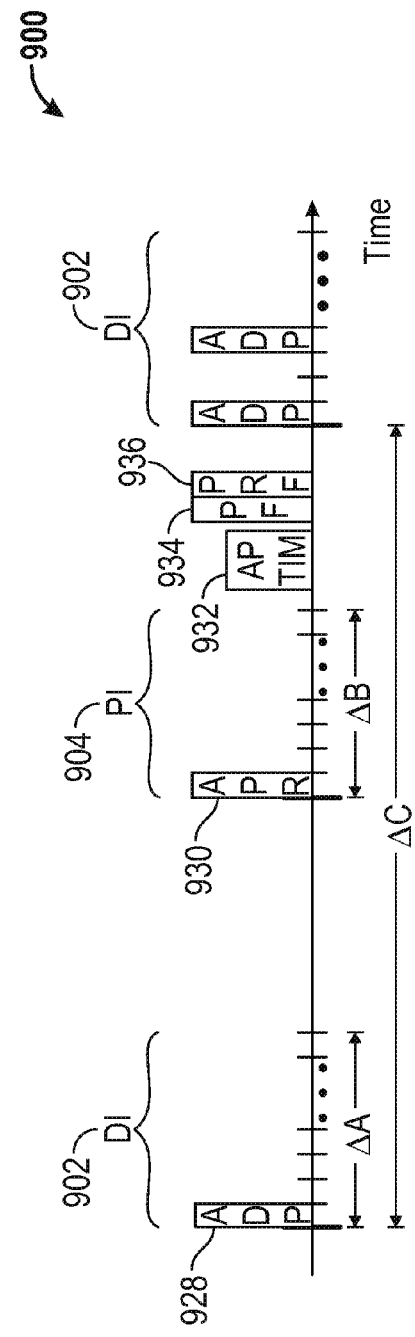

| Field | Size in Octets |
|---|---|
| 11a/n/ac/ah PHY Preamble | Variable |
| Frame Control | 1 |
| Control (I) | 1 |
| Duration | 2 |
| Control (II) | 1-2 |
| Expression | 16 |
| Cyclical Redundancy Check | 4 |

FIG. 10

| Field | Size in Octets |
|---|---|
| 11a/n/ac/ah PHY Preamble | Variable |
| Frame Control | 1 |
| Control (I) | 1 |
| Duration | 2 |
| Time Stamp | 4 |
| Control (II) | 1-2 |
| Expression | 16 |
| Cyclical Redundancy Check | 4 |

FIG. 11

| Field | Size in Octets |
|---|---|
| 11a/n/ac/ah PHY Preamble | Variable |
| Frame Control | 1 |
| Control (I) | 1 |
| Duration | 2 |
| Control (II) | 1-2 |
| Source MAC Address | 6 |
| Signature | 16 |
| Cyclical Redundancy Check | 4 |

FIG. 12

╱─1300
| Field | Size in Octets |
|---|---|
| 1370 — Category | 1 |
| 1372 — Action | 1 |
| 1374 — Device Signature | 8 |
| 1376 — Service Searched | Variable |
| 1378 — Additional Information | Variable |

FIG. 13

╱─1400
| Field | Size in Octets |
|---|---|
| Category | 1 |
| Action | 1 |
| 1480 — MAC Address Requesting STA | 6 |
| 1482 — Signature in Paging Request | 8 |
| 1484 — Additional Information | Variable |

FIG. 14

╱─1500
| Field | Size in Octets |
|---|---|
| Category | 1 |
| Action | 1 |
| 1586 — MAC Address of STA from Paging Response | 6 |
| 1588 — Signature STA Sending Paging Response | 8 |
| 1590 — Additional Information | Variable |

FIG. 15

SYSTEMS AND METHODS FOR TRANSMITTING AND RECEIVING DISCOVERY AND PAGING MESSAGES

CROSS REFERENCE TO RELATED APPLICATIONS

This application claims benefit under 35 U.S.C. §119(e) to U.S. Provisional Patent Application No. 61/570,704 entitled "SYSTEMS AND METHODS FOR TRANSMITTING AND RECEIVING DISCOVERY AND PAGING MESSAGES" filed on Dec. 14, 2011; the disclosure of which is hereby incorporated by reference in its entirety.

FIELD

The present application relates generally to wireless communications, and more specifically to systems, methods, and devices for transmitting and receiving discovery and paging messages.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit or receive information between one other. The information may comprise packets, which may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet. Additionally, packets may be used to introduce two different devices communicating on a communication medium. The communication medium may be shared by multiple devices seeking to access the communication medium.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of this disclosure provides a method of wireless communication performed by an apparatus. The method includes: transmitting a discovery packet during a first discovery interval of a plurality of discovery intervals, the discovery packet advertising a service provided in a wireless communications network, the plurality of discovery intervals comprising recurring time intervals when a plurality of devices are configured to transmit and receive discovery packets; and receiving a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of paging intervals not overlapping the plurality of discovery intervals.

Another aspect of this disclosure provides a method of discovering devices in a wireless communication system performed by an apparatus. The method includes: receiving a discovery packet from a first device during a first discovery interval of a plurality of discovery intervals, the discovery packet advertising a service provided by the first device in a wireless communications network, the plurality of discovery intervals comprising recurring time intervals when a plurality of devices are configured to transmit and receive discovery packets; and transmitting a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of paging intervals not overlapping the plurality of discovery intervals.

One aspect of this disclosure provides an apparatus operable in a wireless communication system. The apparatus includes a transmitter and receiver. The transmitter is configured to transmit a discovery packet during a first discovery interval of a plurality of discovery intervals. The discovery packet advertises a service provided in a wireless communications network, and the plurality of discovery intervals include recurring time intervals when a plurality of devices are configured to transmit and receive discovery packets. The receiver is configured to receive a paging packet from a first device during a first paging interval of a plurality of paging intervals. The paging packet indicates interest in the service, and the plurality of paging intervals comprising recurring time intervals when the plurality of devices are configured to transmit and receive paging packets. The plurality of paging intervals do not overlap the plurality of discovery intervals.

Another aspect of this disclosure provides an apparatus operable in a wireless communication system. The apparatus includes a receiver and transmitter. The receiver is configured to receive a discovery packet from a first device during a first discovery interval of a plurality of discovery intervals. The discovery packet advertises a service provided by the first device in a wireless communications network, and the plurality of discovery intervals include recurring time intervals when a plurality of devices are configured to transmit and receive discovery packets. The transmitter is configured to transmit a paging packet to the first device during a first paging interval of a plurality of paging intervals. The paging packet indicates interest in the service provided by the first device, and the plurality of paging intervals include recurring time intervals when the plurality of devices are configured to transmit and receive paging packets. The plurality of paging intervals do not overlap the plurality of discovery intervals.

One aspect of this disclosure provides an apparatus operable in a wireless communication system. The apparatus includes: means for transmitting a discovery packet during a first discovery interval of a plurality of discovery intervals, the discovery packet advertising a service provided in a wireless communications network, the plurality of discovery intervals comprising recurring time intervals when a plurality of devices are configured to transmit and receive discovery packets; and means for receiving a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of paging intervals not overlapping the plurality of discovery intervals.

Another aspect of this disclosure provides an apparatus operable in a wireless communication system. The apparatus includes: means for receiving a discovery packet from a first device during a first discovery interval of a plurality of discovery intervals, the discovery packet advertising a service provided by the first device in a wireless communications network, the plurality of discovery intervals comprising recurring time intervals when a plurality of devices are configured to transmit and receive discovery packets; and means for transmitting a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of paging intervals not overlapping the plurality of discovery intervals.

One aspect of this disclosure provides a non-transitory computer-readable medium comprising instructions that when executed cause an apparatus to: transmit a discovery packet during a first discovery interval of a plurality of discovery intervals, the discovery packet advertising a service provided in a wireless communications network, the plurality of discovery intervals comprising recurring time intervals when a plurality of devices are configured to transmit and receive discovery packets; and receive a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of paging intervals not overlapping the plurality of discovery intervals.

Another aspect of this disclosure provides a non-transitory computer-readable medium comprising instructions that when executed cause an apparatus to: receive a discovery packet from a first device during a first discovery interval of a plurality of discovery intervals, the discovery packet advertising a service provided by the first device in a wireless communications network, the plurality of discovery intervals comprising recurring time intervals when a plurality of devices are configured to transmit and receive discovery packets; and transmit a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of paging intervals not overlapping the plurality of discovery intervals.

BRIEF DESCRIPTION OF THE DRAWINGS

FIG. 6 illustrates an exemplary communication timeline in a wireless communication system in accordance with aspects of the present disclosure.

FIG. 7 illustrates an exemplary communication timeline in a wireless communication system in accordance with aspects of the present disclosure.

FIG. 8 illustrates an exemplary communication timeline in a wireless communication system in accordance with aspects of the present disclosure.

FIG. 9 illustrates an exemplary communication timeline in a wireless communication system in accordance with aspects of the present disclosure.

FIG. 10 illustrates an exemplary discovery packet in accordance with aspects of the present disclosure.

FIG. 11 illustrates another exemplary discovery packet in accordance with aspects of the present disclosure.

FIG. 12 illustrates an exemplary paging request packet in accordance with aspects of the present disclosure.

FIG. 13 illustrates an exemplary registration action frame in accordance with aspects of the present disclosure.

FIG. 14 illustrates an exemplary paging forwarding action frame in accordance with aspects of the present disclosure.

FIG. 15 illustrates an exemplary paging response forwarding action frame in accordance with aspects of the present disclosure.

DETAILED DESCRIPTION

Figure 1:
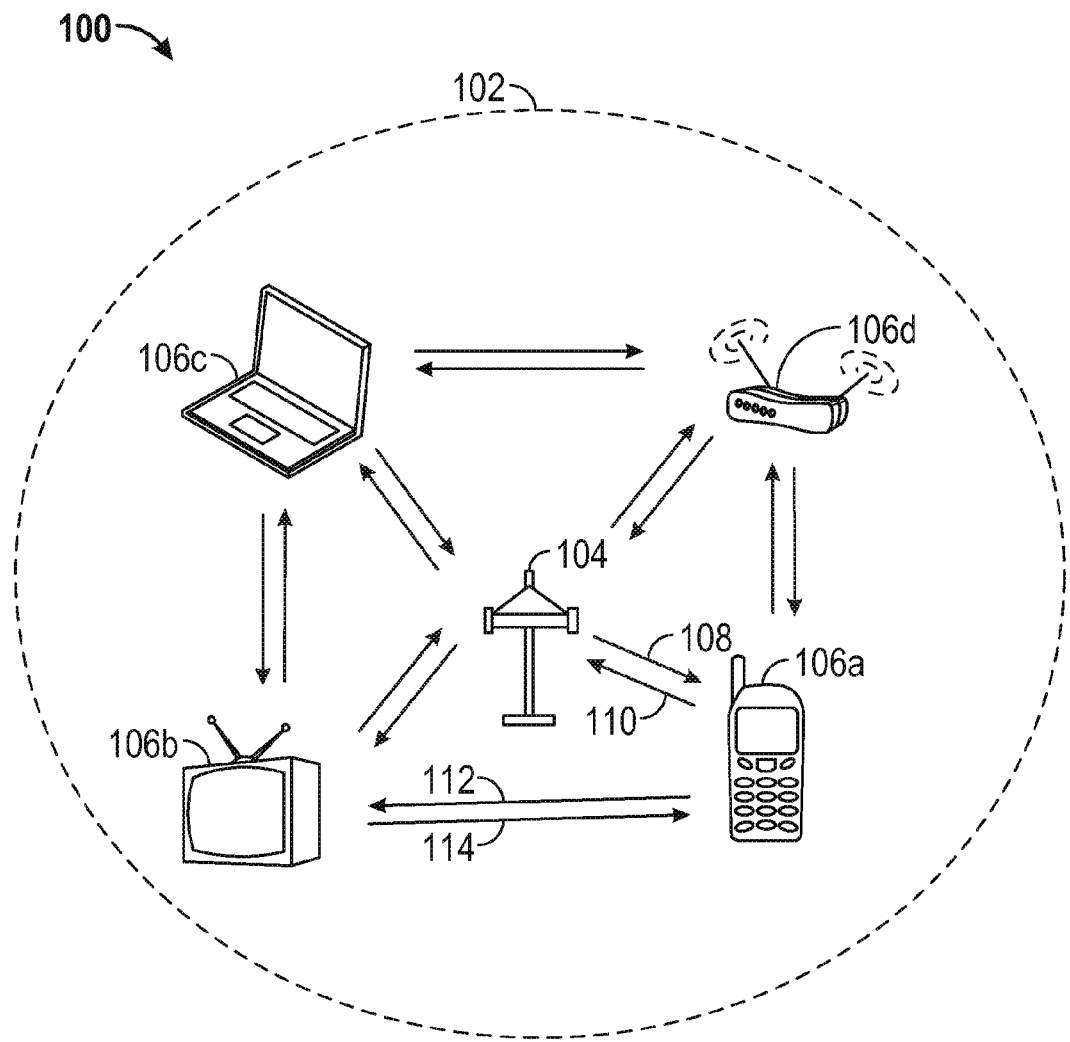
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs. Some communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
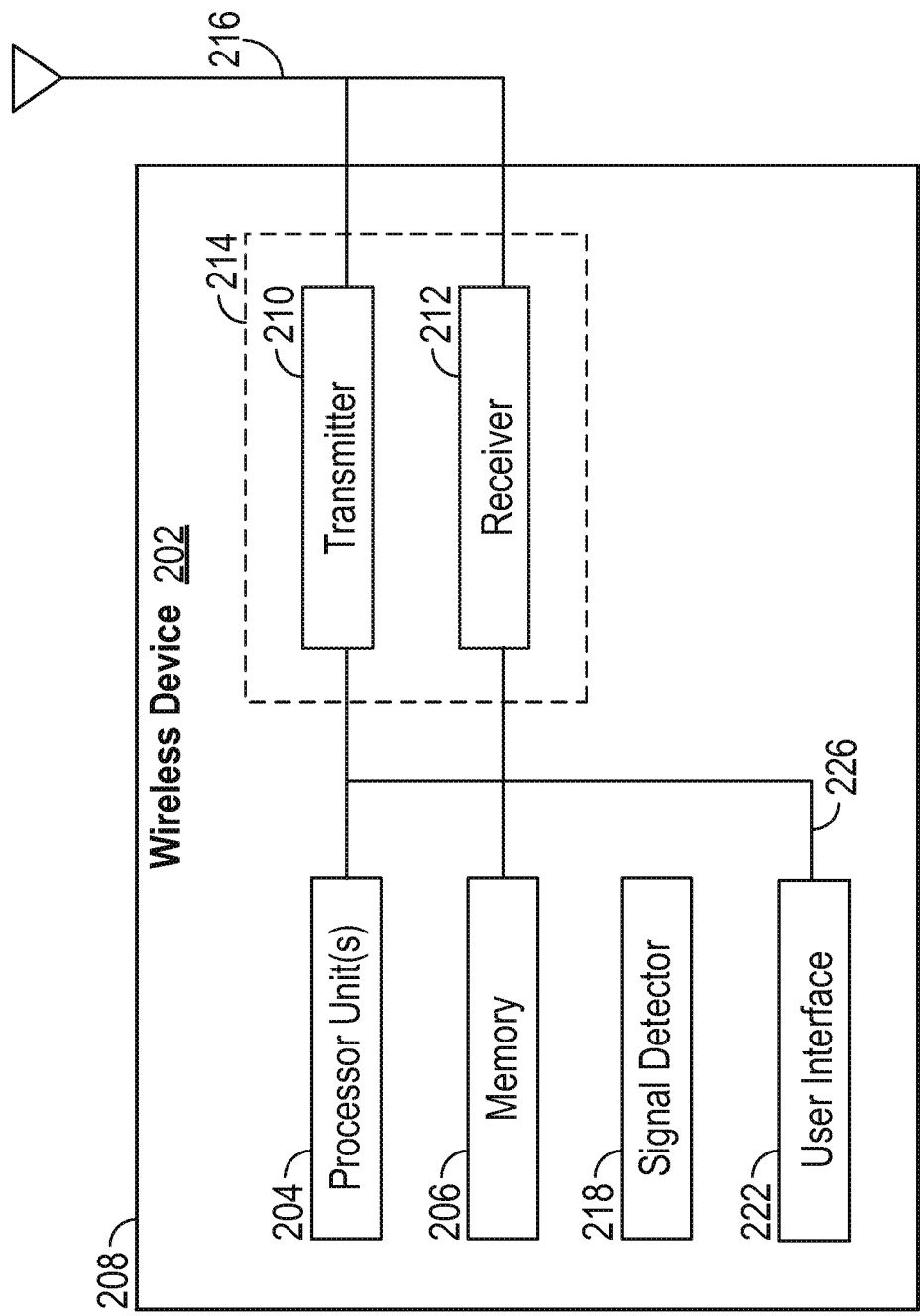
FIG. 2 shows a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet received and to process the packet accordingly.

The wireless device 202 may also include a signal detector 218 that may be used to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

To ensure proper communication between devices such as AP 104 and the STAs 106, the AP 104 or STAs 106 may require information regarding characteristics of the AP 104 or STAs 106. For example, the STA 106 may require timing information about the AP 104 in order to synchronize timing of communication between the STA 106 and the AP 104. Additionally or alternatively, the STA 106 may require other information such as a media access control (MAC) address of the AP 104, an identifier of the basic service set (BSS) served by the AP 104, etc. The STA 106 may determine whether it needs such information independently, such as through software running using memory 206 and processor 204.

The AP 104 or STA 106 may have a plurality of operational modes. For example, the STA 106 may have a first operational mode referred to as an active mode, normal operation mode, or full power mode. In the active mode, the AP 104 or STA 106 may always be in an "awake" state and actively transmit/receive data with another STA 106. Further, the STA 106 may have a second operational mode referred to as a power-save mode or sleep mode. In the power-save mode, the AP104 or STA 106 may be in the "awake" state or a "doze" or "sleep" state where the AP 104 or STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 (e.g., paging messages) that indicate to the STA 106 whether or not the STA 106 needs to "wake up" (e.g., enter the awake state) at a certain time so as to be able to transmit/receive data with the AP 104 or another STA.

Figure 3:
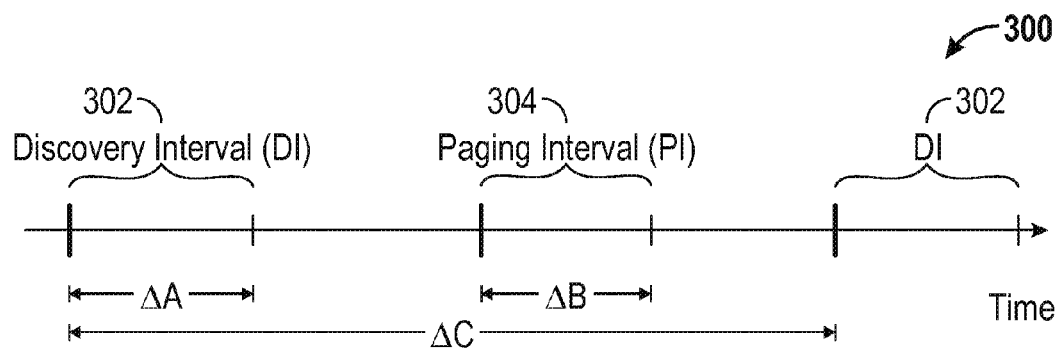
FIG. 3 illustrates an exemplary communication timeline in a wireless communication system in accordance with aspects of the present disclosure.

FIG. 3 illustrates an exemplary communication timeline 300 in a wireless communication system where devices may communicate via a channel. The exemplary communication timeline 300 may include a discovery interval (DI) 302 of a time duration ΔA, a paging interval (PI) 304 of a time duration ΔB, and an overall interval of a time duration ΔC. In some aspects, communications may occur via other channels as well. Time increases horizontally across the page over the time axis.

During the DI 302, APs or STAs may advertise through messages, such as discovery packets, services (e.g., features of applications shared by APs or STAs) that are provided in the wireless communication system. APs or STAs may further listen to broadcast messages transmitted by other APs or STAs. In some aspects, a STA may register with an AP or STA during or outside of the DI 302. After registering, the AP or STA may transmit or receive messages on behalf of the registered STA. In some aspects, the duration of DIs may vary over time. In other aspects, the duration of the DI 302 may remain fixed over a period of time.

The end of the DI 302 may be separated from the beginning of the subsequent PI 304 by a first remainder period of time as illustrated in FIG. 3. The end of the PI 304 may be separated from the beginning of a subsequent DI 302 by a remainder period of time having the same or different length as the first remainder period of time.

During the PI 304, APs or STAs may indicate interest in one or more of a plurality of services advertised in a broadcast message by transmitting paging request messages, such as paging request packets or paging packets. APs or STAs may listen to paging request messages transmitted by other APs or STAs. In some aspects, the duration of the PI 304 may vary over time. In other aspects, the duration of the PI 304 may remain constant over a period of time. In some aspects, the duration of the PI 304 may be shorter than the duration of the DI 302.

The overall interval of duration ΔC may measure the period of time from the beginning of one DI 302 to the beginning of a subsequent DI 302 as illustrated in FIG. 3. In some aspects, the duration of the overall interval may vary over time. In other aspects, the duration of the overall interval may remain constant over a period of time. At the conclusion of the overall interval of duration ΔC, another overall interval may begin, including a DI 302, a PI 304, and the remainder intervals. Consecutive overall intervals may follow indefinitely or continue for a fixed period of time.

A STA may enter a sleep or power-save mode when the STA is not transmitting or listening or expecting to soon transmit or listen. As an example, the STA may sleep during periods other than the DI 302 or PI 304. The STA in the sleep mode or power-save mode may awake or return to normal operation or full power mode at the beginning of the DI 302 or PI 304 to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

Figure 4:
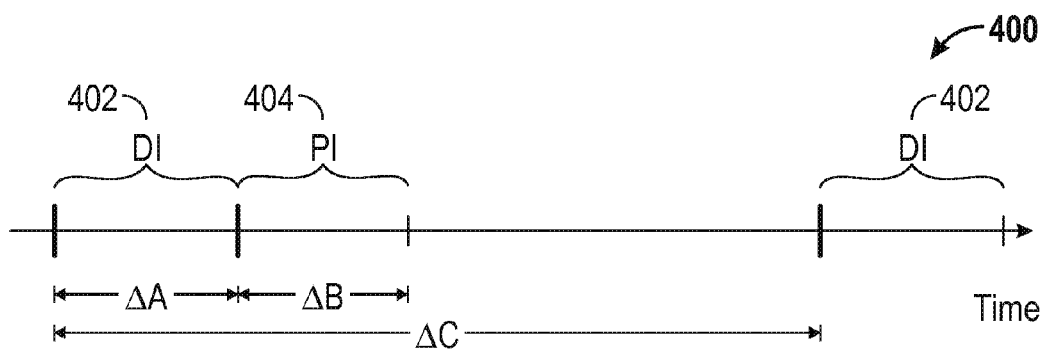
FIG. 4 illustrates an exemplary communication timeline in a wireless communication system in accordance with aspects of the present disclosure.

FIG. 4 illustrates an exemplary communication timeline in a wireless communication system where devices may communicate via a channel. The exemplary communication timeline 400 may include a DI 402 of a time duration ΔA, a PI 404 of a time duration ΔB, and an overall interval of a time duration ΔC. Time increases horizontally across the page over the time axis. As illustrated in FIG. 4, the beginning of a PI 404 may immediately follow the end of a DI 402. The end of the PI 404 may be separated from the beginning of a subsequent DI by a remainder period of time equal to ΔC less the sum of ΔB and ΔA.

Figure 5:
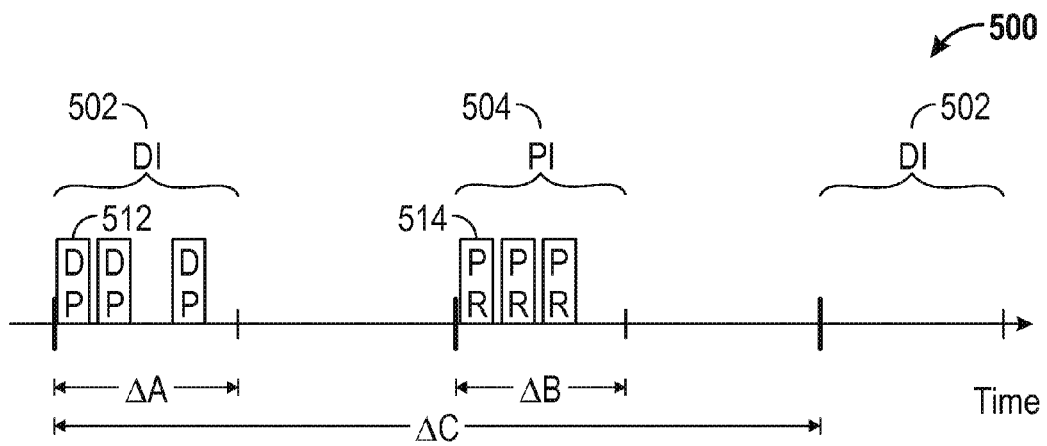
FIG. 5 illustrates an exemplary communication timeline in a wireless communication system in accordance with aspects of the present disclosure.

FIG. 5 illustrates an exemplary communication timeline 500 in a wireless communication system where devices may communicate via a channel. The exemplary communication timeline 500 may include a DI 502 of a time duration ΔA, a PI 504 of a time duration ΔB, and an overall interval of a time duration ΔC. Time increases horizontally across the page over the time axis. During the DI 502, APs or STAs may transmit discovery packets (DPs). During the PI 504, APs or STAs may transmit paging request packets (PRs). A DP may be a packet configured to advertise a plurality of services provided by a STA or AP and to indicate when the paging interval is for the device that transmits the DP. The DP may have a fixed or variable size and include a data frame, management frame, or management action frame. The DP may carry information generated by a higher layer discovery protocol or an application-based discovery protocol. The PR may have a fixed or variable size and be a packet configured to indicate interest in at least one of the plurality of services provided by an AP or STA.

The communication channel may be cleared of devices communicating using legacy protocols during the DI 502 and PI 504 of packets, in some aspects, by transmitting special clear to send (S-CTS) frames. A S-CTS frame may instruct devices using legacy protocols to refrain from sending data for a given time. However, the S-CTS may still allow devices to send discovery packets and paging request packets.

The APs and STAs may contend for use of the channel during the DI 502 and PI 504 to determine which APs and/or STAs may transmit DPs or PRs at a particular time. In some aspects, the contention method utilized may include carrier sense multiple access (CSMA). CSMA may be a probabilistic Media Access Control (MAC) protocol in which an AP or STA verifies the absence of other traffic before transmitting a packet on the shared transmission channel. In other aspects, the contention method utilized may include CSMA with collision avoidance (CSMA/CA). Under the CSMA/CA approach, if the channel may be sensed as busy, transmission may be deferred for an interval. The deferred interval may be random or determined using another scheme such as an interval lookup table. CSMA/CA may be the default 802.11 MAC approach. Utilizing a contention approach may provide the benefit of enabling fixed overhead to scale linearly with the number of devices in the wireless communication system as opposed to scaling based on the number of devices squared. Additionally, a contention approach may be used to determine when devices may transmit packets outside of the DI 502 or PI 504. In some cases, a contention approach may further provide beneficial flexibility particularly when the clocks of communicating devices may not be tightly synchronized.

The start and end of the DI 502 and PI 504 may be known via various methods to each STA desiring to transmit a discovery packet or a paging request packet. In some aspects, each STA may synchronize its clock with the other APs or STAs and thereby also receive an indication of the DI 502 and PI 504 start time and DI 502 duration and PI 504 duration. In other aspects, a device may send a signal such as a S-CTS signal to clear the channel or medium of legacy communications, such as communications that may conflict or not be compliant with aspects of the present disclosure, and indicate the beginning and duration of the DI 502 or PI 504 period, as well as additional information about the DI 502 and PI 504 durations.

As an example, FIG. 5 depicts that devices may contend to transmit three discovery packets on the channel during the DI 502. The three discovery packets may be transmitted by up to three different STAs. If the three discovery packets are transmitted by more than one STA, the STAs may use a CSMA/CA approach to determine which packet may be transmitted at a particular time. The STAs may have synchronized clocks and may have previously communicated a shared DI 502 duration such that each STA may be aware of the approximate DI 502 start and end time. In some aspects, each STA desiring to transmit a discovery packet may select a random initial transmission time within the DI 502 to attempt to transmit a discovery packet or packets. In other aspects, the STA may select a predetermined or scheduled initial transmission time. Before transmitting, each STA may sense the medium for a period of time to determine whether a communication may be currently in progress on the channel. In some aspects, the STA may sense the medium for approximately 25 µs. If the medium may be clear, the STA may transmit a discovery packet such as discovery packet (DP) 512. If the medium may not be clear, the STA may delay transmitting the discovery packet for a delay period. The delay period may be random in some aspects while calculated or predetermined in other aspects. After the delay period, the STA may again sense the medium, and if the medium may be clear, the STA may transmit the discovery packet. If the medium may not be clear, the STA may repeat the delay and sense process until the discovery packet may be successfully sent.

The process of sending a paging request packet during the PI 504 may similar to the process described above with respect to transmitting a discovery packet during the DI 502. As an example, FIG. 5 depicts that devices may contend to transmit three paging request packets on the channel during the PI 504. The three paging request packets may be transmitted by up to three different STAs. If the three discovery packets are transmitted by more than one STA, the STAs may use a CSMA/CA approach to determine which packets may be transmitted at a particular time. The STAs may have synchronized clocks and may have previously communicated a shared PI 504 duration such that each STA may be aware of the approximate PI 504 start and end time. In some aspects, each STA desiring to transmit a paging request packet may select a random initial transmission time within the PI 504 to attempt to transmit its paging request packet or packets. Before transmitting, each STA may sense the medium to determine whether a communication may be currently in progress on the channel. In some aspects, the STA may sense the medium for approximately 25 µs. If the medium may be clear, the STA may transmit a paging request packet such as paging request packet (PR) 514. If the medium may not be clear, the STA may delay transmitting the paging request packet for a delay period. The delay period may be random in some aspects while calculated or predetermined in other aspects. After the delay period, the STA may again sense the medium, and if the medium may be clear, the STA may transmit the paging request packet. If the medium may not be clear, the STA may repeat the delay and sense process until the paging request packet may be successfully sent.

STAs interested in services advertised via discovery packets, such as at least one of the plurality of services advertised in DP 512, may awake or remain awake during the DI 502 and process discovery packets to determine if a particular discovery packet may contain information about one or more of a plurality of services of interest provided by a device. After the DI 502 period, STAs not planning to communicate information may enter a sleep or power-save mode until the next time the STAs plan to communicate. In some aspects, a STA may enter the sleep or power-save mode until the STA communicates information with another device outside of the DI 502 or PI 504. In some aspects, the STA may enter the sleep or power-save mode until the beginning of the next PI 504. At the beginning of the PI 504, the interested STA may awake to transmit a paging request packet to the provider of the service.

STAs waiting for responses to a transmitted discovery packet, such as the plurality of services advertised in DP 512, may awake or remain awake during the PI 504 and process paging request packets, such as PR 514, to determine if a particular paging request packet indicates interest by another device in at least one of plurality of services provided by the STA. After the PI 504 period, STAs not planning to communicate information may enter a sleep or power-save mode until the next time the STAs plan to communicate. In some aspects, a STA may enter the sleep or power-save mode until the STA may communicate additional information with another device outside of the DI 502 or PI 504. In some aspects, the STA may enter the sleep or power-save mode until the beginning of the next DI 502.

As examples, the duration ΔC of the overall interval may equal approximately one to five seconds in some aspects. In other aspects, the overall interval may be less than one second or more than five seconds. The duration ΔA of the DI 502 may equal approximately 16 ms in some aspects while more or less than 16 ms in other aspects. The duration ΔB of the PI may equal approximately the duration ΔA in some aspects. In other aspects, the duration ΔB may be more or less than the duration ΔA.

FIG. 6 illustrates an exemplary communication timeline 600 in a wireless communication system. The exemplary communication timeline 600 may include a DI 602 of a time duration ΔA, a PI 604 of a time duration ΔB, and an overall interval of a time duration ΔC. Time increases horizontally across the page over the time axis.

As shown in FIG. 6, the DI 602 may include DI slots, such as DI slot 616, and the PI 604 may include PI slots, such as PI slot 618. The DI slots or PI slots may facilitate a scheduled approach to access of a channel or medium during the DI 602 or the PI 604, respectively. The DI slots may each have a same duration that is known by devices in a wireless communications network, and PI slots may further each have a same duration that is known by devices in a wireless communications network. The DI slots and the PI slots may have different durations in some aspects and the same durations in other aspects. The DI slots may represent periods of time when particular STAs or APs may transmit a discovery packet or when a STA may transmit a registration request packet to an AP. For example, a STA may be assigned to transmit a discovery packet during DI slot 616. The PI slots may represent periods of time when particular STAs or APs may transmit paging request packets. For example, another STA may be assigned to transmit a paging request packet during PI slot 618. The DI and PI slots may have a duration equal to the time to transmit a discovery packet or paging request packet, respectively, plus a point coordination function interface space (PIFS) time.

The DI slots and PI slots may be assigned to STAs or APs using a hash calculation of device MAC IDs in some aspects. Random time-varying parameters may be added to the hash function so that two MAC ID's may not repeatedly collide over time. Collaborative mechanisms, such as sensing the medium and taking an empty slot, may be further utilized to determine or assign slots. In some aspects, if a device may sense the medium as busy for a PIFS time of approximately 25 μs before the start of one slot, the device may abandon or delay transmission of a discovery packet or a paging request packet during the slot.

Each STA or AP communicating or planning to communicate on the channel may transmit a discovery packet at least once every particular period to notify other devices of the STA or AP's presence on the channel. Additionally, as discussed in with respect to FIG. 5, STAs or APs may enter a sleep or power-save mode during certain times, such as during particular intervals discussed in FIG. 5.

FIG. 7 illustrates an exemplary communication timeline 700 in a wireless communication system. The exemplary communication timeline 700 may include a DI 702 of a time duration ΔA, a PI 704 of a time duration ΔB, and an overall interval of a time duration ΔC. Time increases horizontally across the page over the time axis. The DI 702 and PI 704 may be slotted as depicted in FIG. 7.

The beginning of the DI 702 may begin with the transmission of a discovery start frame (DSF) packet 720 by a STA or AP. The DSF packet 720 may be transmitted by contention. In some aspects, the DSF packet 720 may be a discovery packet with a frame control value indicating that the packet is a DSF packet. The DSF packet 720 may prevent other traffic from communicating on the channel until a subsequent discovery packet (DP) is transmitted on the channel or during the DI 702. In other aspects, the DSF packet 720 may be a clear to send (CTS) frame. The CTS frame may carry a Social WiFi BSSID in the address field. The duration of the DI 702 may be previously communicated to devices in some aspects while devices may sense the end of the DI 702 based on the absence of communication on the channel for a period of time in other aspects.

The beginning of the PI 704 may begin with the transmission of a paging start frame (PSF) packet 722 by a STA or AP. The PSF packet 722 may be transmitted by contention. In some aspects, the PSF packet 722 may be a paging request packet with a frame control value indicating that the packet is a PSF packet. The PSF packet 722 may prevent other traffic from communicating on the channel until a subsequent paging request packet (PR) is transmitted on the channel or during the PI 704. In other aspects, the PSF packet 722 may be a clear to send (CTS) frame. The CTS frame may carry a Social WiFi BSSID in the address field. The start or duration of the PI 704 may be previously communicated to devices in some aspects while devices may sense the start or end of the PI 704 based on the presence or absence of communication on the channel for a period of time in other aspects.

In addition, as discussed with respect to FIG. 5, STAs or APs may enter a sleep or power-save mode during certain times, such as during particular intervals.

FIG. 8 illustrates an exemplary communication timeline 800 in a wireless communication system. The exemplary communication timeline 800 may include a DI 802 of a time duration ΔA, a PI 804 of a time duration ΔB, and an overall interval of a time duration ΔC. Time increases horizontally across the page over the time axis. The DI 802 may be slotted while the PI 804 may be unslotted as shown in FIG. 8. In other aspects, the DI 802 may be unslotted while the PI 804 may be slotted.

The beginning of the DI 802 may begin with the transmission of one or more S-CTS packets 824 by a STA or AP. In some aspects, the S-CTS packet may be a CTS frame with a frame control value indicating that the frame is a S-CTS packet. The S-CTS packet may prevent legacy traffic from communicating on the channel during the DI 802. The start or duration of the DI 802 may be previously communicated to devices in some aspects while devices may sense the start or end of the DI 802 based on the presence or absence of communication on the channel for a period of time in other aspects. The exemplary timeline may further include a time duration ΔD beginning at the transmission of the first S-CTS and ending at the end of the DI 802.

The beginning of the PI 804 may begin with the transmission of a PSF packet by a STA or AP. In some aspects, the PSF packet may be a paging request packet with a frame control value indicating that the packet is a PSF packet. The PSF packet may prevent other traffic from communicating on the channel until a subsequent paging request packet (PR) is transmitted on the channel or during the PI 804. In other aspects, the PSF packet may be a clear to send (CTS) frame. The CTS frame may carry a Social WiFi BSSID in the address field. The start or duration of the PI 804 may be previously communicated to devices in some aspects while devices may sense the start or end of the PI 804 based on the presence or absence of communication on the channel for a period of time in other aspects. In yet other aspects, the PI 804 may begin with the transmission of one or more S-CTS packets by a device. The paging request packets transmitted during the PI 804 may be sent using a contention approach as discussed with respect to FIG. 5.

Additionally, as discussed with respect to FIG. 5, STAs or APs may enter a sleep or power-save mode during certain times, such as during particular intervals outside of a discovery interval or paging interval.

FIG. 9 illustrates an exemplary communication timeline 900 in a wireless communication system. The exemplary communication timeline 900 may include a DI 902 of a time duration ΔA, a PI 904 of a time duration ΔB, and an overall interval of a time duration ΔC. Time increases horizontally across the page over the time axis. The DI 902 and PI 904 may be slotted in some aspects as depicted in FIG. 9. In other aspects, the DI 902 or PI 904 may be unslotted as discussed with respect to FIG. 5, and STAs or APs may contend to communicate on the channel.

An AP may be used to send and receive messages on behalf of one or more STAs in the wireless communication system. STAs may register with the AP before the AP may send or receive messages on behalf of a STA or before STAs may receive other services provided by the AP. The registration process may include the STA sending a registration request packet providing information about services provided by the STA or services desired by the STA from other devices. The AP may then transmit access point discovery packets (ADPs) or access point paging request packets (APRs) on behalf of the STAs, among other services.

An AP may be used to wake STAs from a sleep or power-save mode. Since the AP may transmit messages on behalf of STAs, STAs associated with the AP may enter a sleep or power-save mode until the AP may wake the STAs with information that a discovery packet of interest or paging request message was received. The AP may use an 802.11 TIM message or broadcast TIM interval negotiation procedure, for instance, to determine when to wake STAs from the sleep or power-save mode.

An AP may be used to forward information to STAs so that STAs may communicate directly with other STAs or APs. Since the AP may communicate discovery packets or paging request packets on behalf of STAs, the AP may directly receive responses the packets on behalf of STAs. The AP may then forward discovery packet or paging request packet information to the STA whom the AP acted on behalf of. The forwarded information may be transmitted in the form of a paging forward action frame or a paging response forward action frame, or the like. In some aspects, if the STA may be unable to contact the other STAs or APs after attempting to contact for a time-out period, the STA may terminate attempts to communicate with the other STAs and APs.

As illustrated in FIG. 9, an AP may transmit an ADP 928 during a DI 902 or APR 930 during a PI 904 on behalf of a STA. When the AP may receive a discovery packet of interest to a STA or paging request packet for a STA, the AP may wake the STA from the sleep or power-save mode by sending an AP TIM message 932 outside of the DI or PI. In some aspects, packets transmitted outside of the DI or PI may be transmitted using a contention approach. The AP may then transmit a paging forward action frame (PF) 934 or a paging response forward action frame (PRF) 936 to the STA notifying the STA of the received discovery packet of interest or paging request packet for the STA. The STA may subsequently communicate directly with the sender of the discovery packet or the paging request packet. In some aspects, the AP may additionally or alternatively send the PF 934 or the PRF 936 to the sender of the discovery packet of interest or the paging request packet, enabling the sender to directly communicate with the STA.

FIG. 10 illustrates an exemplary discovery packet 1000. As shown, the exemplary packet 1000 may include seven fields: an 11 a/n/ac/ah PHY preamble field 1050, a frame control field 1052, a control (I) field 1054, a duration field 1056, a control (II) field 1058, an expression field 1060, and a cyclical redundancy check field 1062. FIG. 10 further indicates an example size in octets of each of the fields 1050-1062.

The frame control field 1052 may include at least information about a type and subtype of the packet. The frame control field 1052 may assist a parser in correctly processing and distinguishing a discovery packet from one or more legacy packets. The legacy packets may include any packet not configured to be a discovery packet in some aspects. The control (I) field 1054 and the control (II) field 1058 may include control information, such as an 11 bits slot number, 1 bit indicator that more data follows so that a STA may send additional messages after a DI, or 1 bit indicator that more data is available so that a STA with more data to advertise may awake or remain awake after the DI to receive poll requests. In some aspects, the duration field 1056 may be removed.

In an example, the DI may have a maximum duration of 16 ms. The transmission time of the discovery packet may be 48 μs (6 Mbps at 20 MHz, 11a/g preamble), plus a 25 μs PIFS. Accordingly, the total number of discovery slots in eight DIs over 8 seconds may be approximately 1750 discovery slots.

FIG. 11 illustrates an exemplary discovery packet 1100. The exemplary discovery packet 1100 may include the same fields as the discovery packet 1000 except for the addition of a time stamp field 1164. As shown, the exemplary packet 1100 may include eight fields: an 11a/n/ac/ah PHY preamble field, a frame control field, a control (I) field, a duration field, a time stamp field 1164, a control (II) field, an expression field, and a cyclical redundancy check field. FIG. 11 further indicates an example size in octets of each of the fields. The time stamp field 1164 may enable STAs to synchronize and adjust their clocks to the highest time stamp received, for instance.

In an example, the DI may have a maximum duration of 16 ms. The transmission time of the discovery packet may be 52 μs (6 Mbps at 20 MHz, 11a/g preamble), plus 77 μs PIFS. Accordingly, the total number of discovery slots in eight DIs over 8 seconds may be approximately 1650. In other aspects, the discovery packet may include have one or more different fields or values.

FIG. 12 illustrates an exemplary paging request packet 1200, which may include the same fields as the discovery packet 1000 except for the addition of a source MAC address field 1266 and the signature field 1268 in place of the expression field 1060. As shown, the exemplary packet 1200 may include eight fields: an 11a/n/ac/ah PHY preamble field, a frame control field, a control (I) field, a duration field, a control (II) field, a source MAC address field 1266, a signature field 1268, and a cyclical redundancy check field. FIG. 12 further indicates an example size in octets of each of the fields.

The paging request packet may be addressed to the sender of the discovery packet. The signature field 1268 may include the destination address and the sender MAC address. A bit in control (I) or control (II) may indicate the expected response, such as a frame including the responder's MAC address and/or additional discovery information.

In an example, the transmission time of the paging request packet may be approximately 77 μs (52 μs (6 Mbps at 20 MHz, 11a/g preamble) plus 25 μs PIFS). For 25 paging slots (~number discovery slots/10), the paging interval may be approximately 2 ms.

FIG. 13 illustrates an exemplary registration action frame 1300 that may be used to register a STA at an AP. As shown in FIG. 13, the exemplary registration action frame 1300 may include five fields: a category field 1370, an action field 1372, a device signature field 1374, a service searched field 1376, and an additional information field 1378. FIG. 13 further indicates an example size in octets of each of the fields 1370-1378. The additional information field 1378 may indicate information that may be sent outside of a PI. In some aspects, the information sent outside of the PI may be transmitted using a contention approach.

FIG. 14 illustrates an exemplary paging forwarding action frame 1400 to forward to a STA a paging request received by an AP, as discussed with respect to FIG. 9. As shown in FIG. 14, the exemplary paging forwarding action frame 1400 may include five fields: a category field, an action field, a MAC address requesting STA field 1480, a signature in paging request field 1482, and an additional information field 1484. FIG. 14 further indicates an example size in octets of each of the fields.

FIG. 15 illustrates an exemplary paging response forwarding action frame 1500 to forward information to a STA regarding a paging response received by an AP. As shown in FIG. 15, the exemplary paging forwarding action frame 1500 may include five fields: a category field, an action field, a MAC address of STA from paging response field 1586, a signature STA sending paging response field 1588, and an additional information field 1590. FIG. 15 further indicates an example size in octets of each of the fields.

Figure 16:
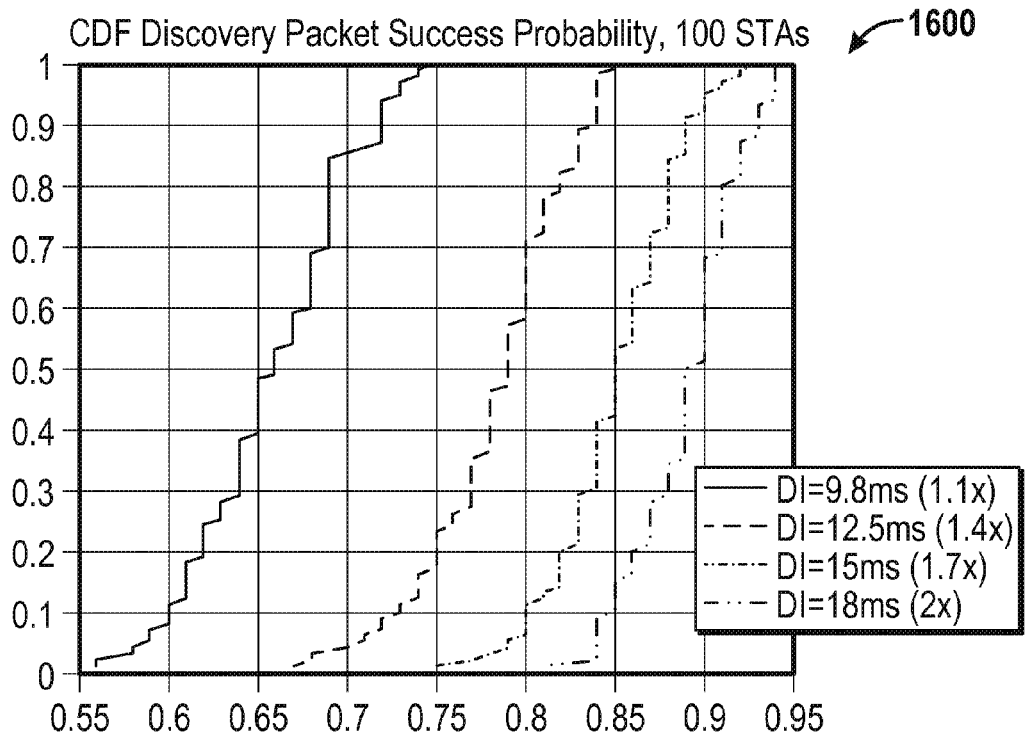
FIG. 16 is a graph illustrating an example cumulative distribution function for successfully transmitting a discovery packet by contention in accordance with aspects of the present disclosure.

FIG. 16 is a graph 1600 illustrating an example cumulative distribution function for successfully transmitting a discovery packet using CSMA. In this example, the discovery packet size was 30 octets. The contention window equaled 15. The DI ranged from 9.4 ms (the leftmost function shown on the graph 1600) to 17 ms (the rightmost function shown on the graph 1600) for 100 STAs. These values may correspond to 1.1 times to 2 times the time required to transmit 100/200 discovery packets plus PIFS. In addition, it was assumed that there are no hidden nodes in the wireless communication system (e.g., the STAs are aware of or see each other). Based on the graph 1600, a DI duration of approximately 2 times the time to transmit the DPs may result in greater than 80% success when sending discovery packets.

Figure 17:
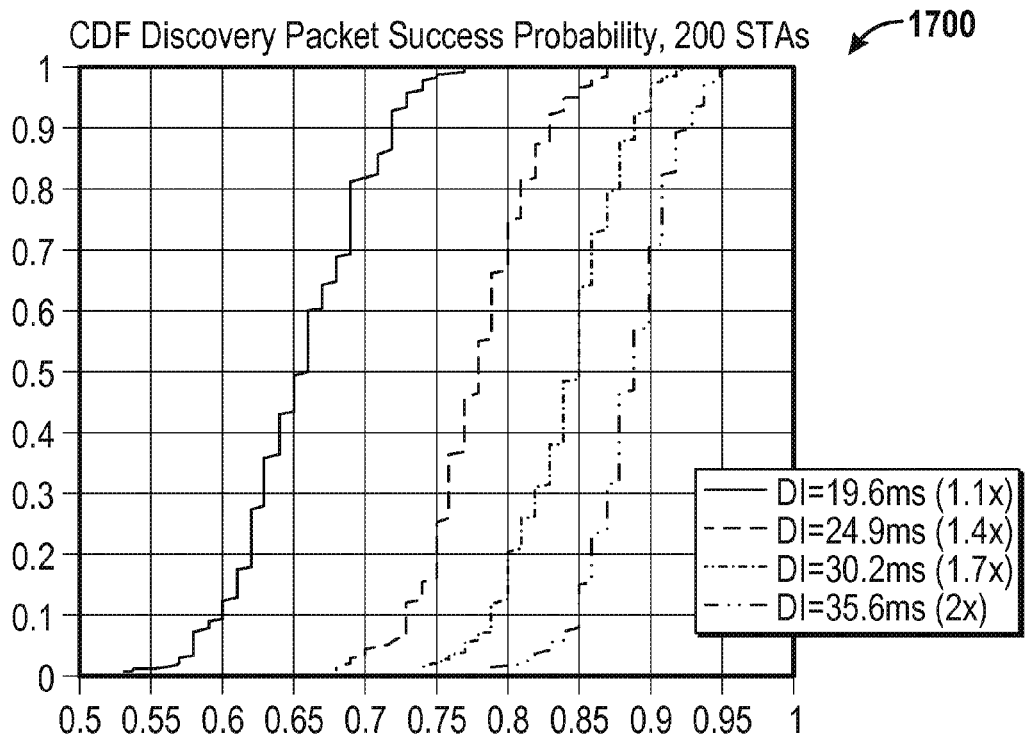
FIG. 17 is another graph illustrating an example cumulative distribution function for successfully transmitting a discovery packet by contention in accordance with aspects of the present disclosure.

FIG. 17 is a graph 1700 illustrating an example cumulative distribution function for successfully transmitting a discovery packet using CSMA. In this example, the discovery packet size was 30 octets. The contention window equaled 15. DI ranged from 18.7 ms (the leftmost function shown on the graph 1700) to 34 ms (the rightmost function shown on the graph 1700) for 200 STAs. These values may correspond to 1.1 times to 2 times the time required to transmit 100/200 discovery packets plus PIFS. In addition, it was assumed that there are no hidden nodes in the wireless communication system (e.g., the STAs are aware of or see each other). Based on the graph 1700, a DI duration of approximately 2 times the time to transmit the DPs may result in greater than 80% success when sending discovery packets.

Figure 18:
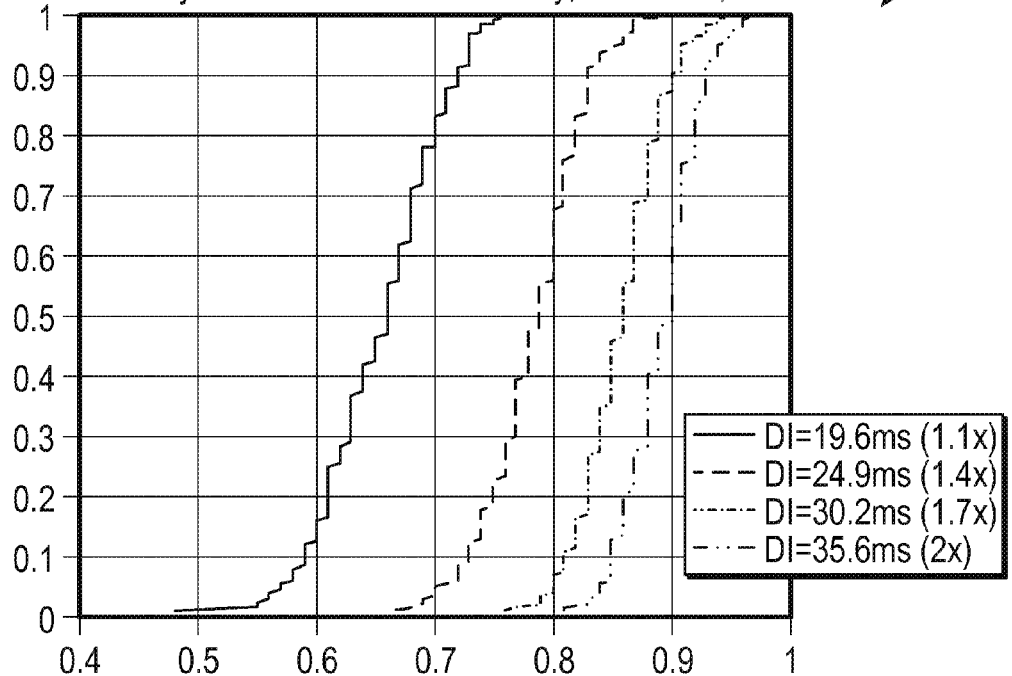
FIG. 18 is a yet another graph illustrating an example cumulative distribution function for successfully transmitting a discovery packet by contention in accordance with aspects of the present disclosure.
Figure 19:
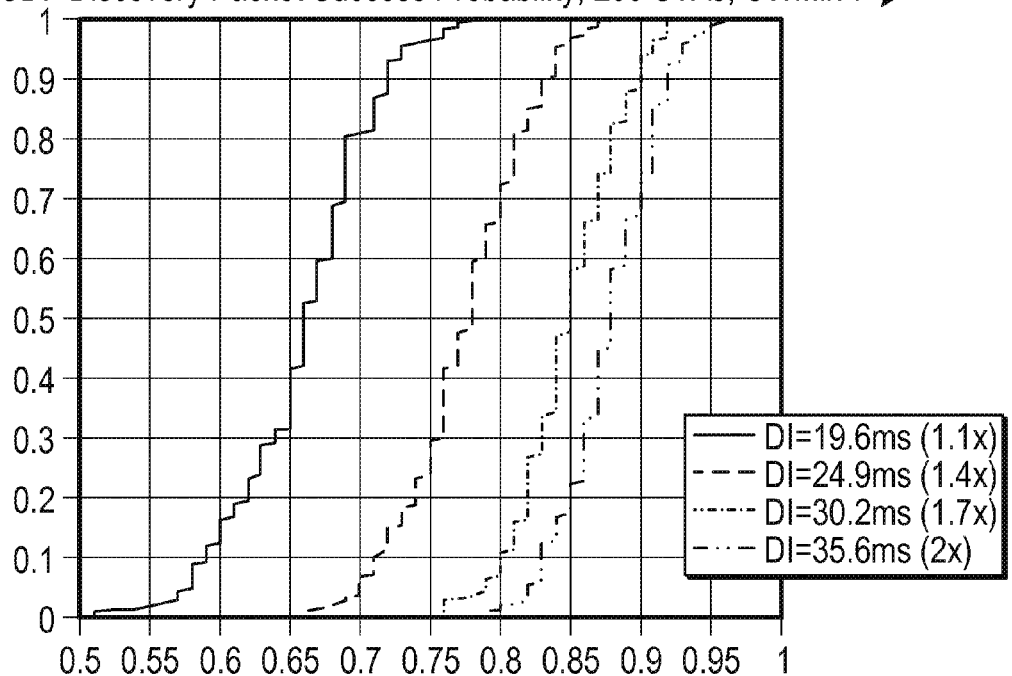
FIG. 19 is an additional graph illustrating an example cumulative distribution function for successfully transmitting a discovery packet by contention in accordance with aspects of the present disclosure.

FIGS. 18 and 19 are graphs 1800, 1900 illustrating an example cumulative distribution functions for successfully transmitting a discovery packet using CSMA. The example values and assumptions used to prepare these graphs 1800, 1900 were the same as those used to prepare the graphs of FIGS. 16 and 17. Based on these graphs 1800, 1900, it can be seen that increasing or decreasing the contention window may have a limited impact on successfully transmitting a discovery packet using CSMA. However, increasing the contention window value may slightly improve the probability of successfully transmitting a discovery packet.

Figure 20:
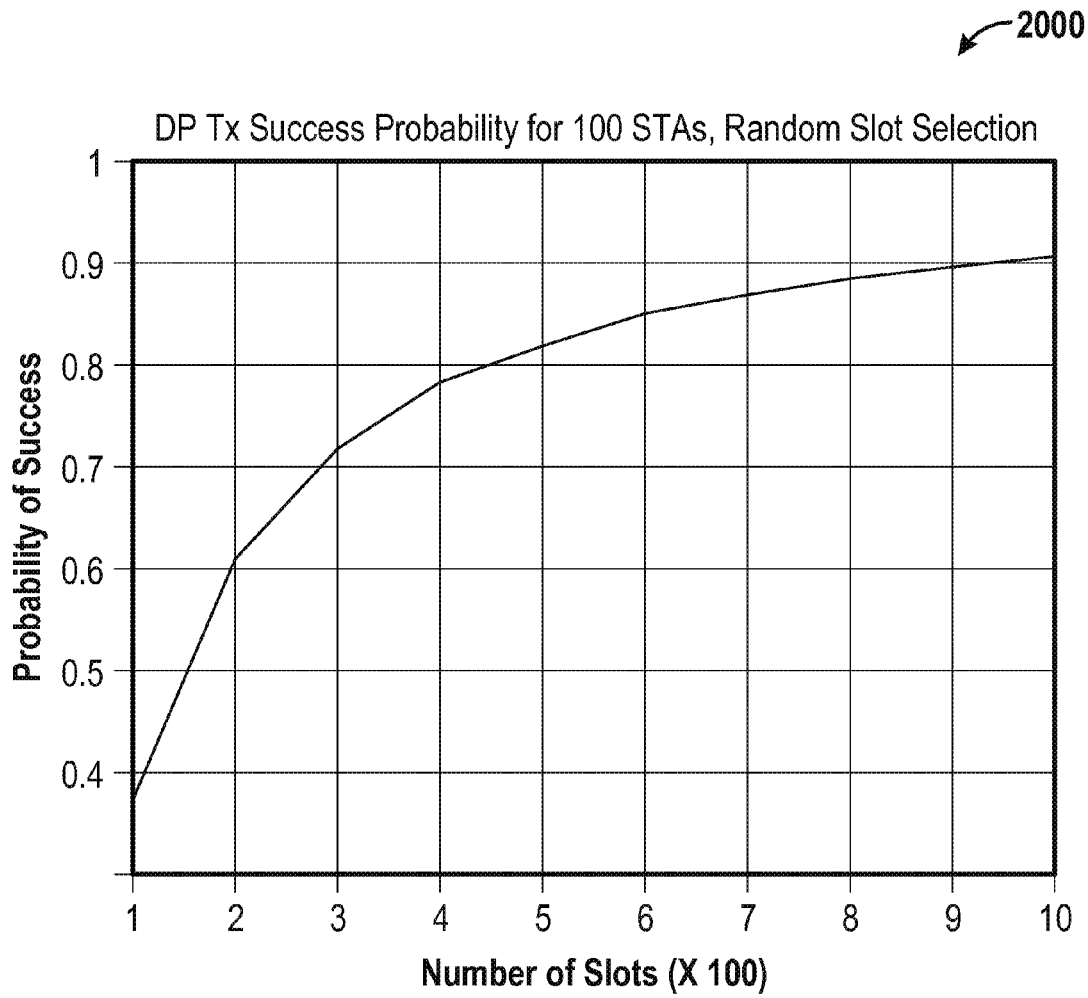
FIG. 20 is a graph illustrating an example probability of success function for successfully transmitting a discovery packet by random slot selection in accordance with aspects of the present disclosure.

FIG. 20 is a graph 2000 illustrating an example probability of success for successfully transmitting a discovery packet by random slot selection. In this example, it was assumed that there are no hidden nodes in the wireless communication system (e.g., the STAs are aware of or see each other). Based on the graph 2000, if a random slot may be selected, a ratio of 5 times the number of STAs as slots may result in a greater than 80% chance of successfully transmitting a discovery packet.

Figure 21:
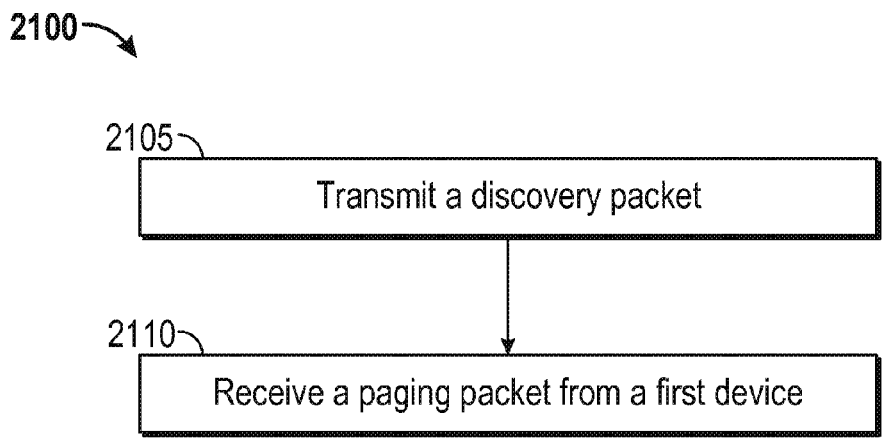
FIG. 21 is a flowchart of an exemplary process of discovering devices in a wireless communication system in accordance with aspects of the present disclosure.

FIG. 21 is a flowchart of an exemplary process 2100 of discovering devices in a wireless communication system in accordance with aspects of the present disclosure. The process 2100 may be used to introduce two devices as discussed in the description of FIGS. 5, 7, and 8, for example. Although the process 2100 is described below with respect to the elements of the wireless device 202, other components may be used to implement one or more of the steps described herein.

At block 2105, a discovery packet may be transmitted during a first discovery interval of a plurality of discovery intervals. The discovery packet may be configured to advertise one or more services provided in a wireless communications network, such as one or more services provided by the transmitting device. The plurality of discovery intervals may include recurring time intervals when multiple devices are configured to transmit and receive discovery packets. The transmission may be performed by the transmitter 214, for example.

At block 2110, a paging packet may be received from a first device during a first paging interval of a plurality of paging intervals. The paging packet may be configured to indicate interest in at least one of the services provided by the transmitting device. The plurality of paging intervals may include recurring time intervals when the multiple devices are configured to transmit and receive paging packets. The plurality of paging intervals may not overlap the plurality of discovery intervals. The receiving may be performed by receiver 212, for example.

Figure 22:
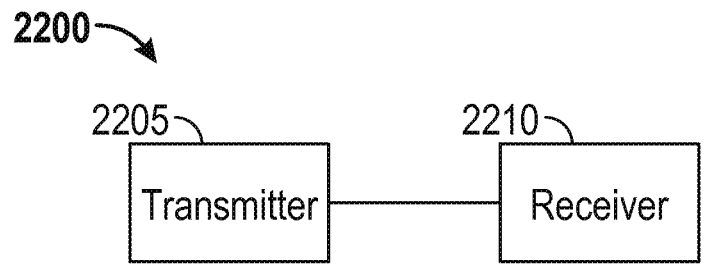
FIG. 22 is a functional block diagram of an exemplary wireless device that may be employed within the wireless communication system of FIG. 1.

FIG. 22 is a functional block diagram of an exemplary wireless device 2200 that may be employed within the wireless communication system of FIG. 1. The wireless device 2200 may include a transmitter 2205 for transmitting a discovery packet during a first discovery interval. The transmitter 2205 may be configured to perform one or more functions discussed above with respect to block 2105 of FIG. 21. The transmitter 2205 may correspond to transmitter 210. The wireless device 2200 may further include a receiver 2210 configured to receive a paging request packet from a first device during a first paging interval. The receiver 2210 may be configured to perform one or more functions discussed above with respect to block 2110 of FIG. 21. The receiver 2210 may correspond to receiver 212.

Moreover, in one aspect, means for transmitting a discovery packet during a first discovery interval may comprise the transmitter 2205. In another aspect, means for receiving a paging request from a first device during a first paging interval may comprise the receiver 2210.

Figure 23:
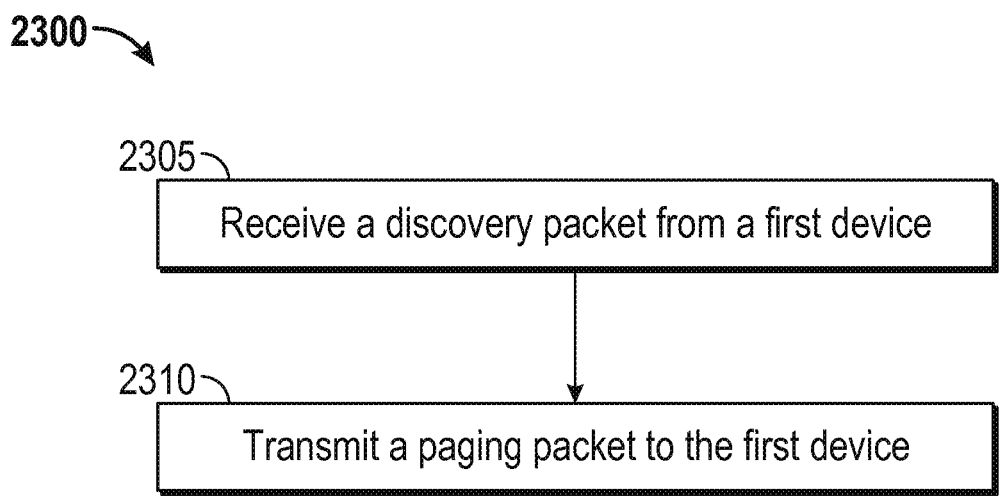
FIG. 23 is a flowchart of an exemplary process of discovering devices in a wireless communication system in accordance with aspects of the present disclosure.

FIG. 23 is a flowchart of an exemplary process 2300 of discovering devices in a wireless communication system in accordance with aspects of the present disclosure. The process 2100 may be used to introduce two devices as discussed in the description of FIGS. 5, 7, and 8, for example. Although the process 2300 is described below with respect to the elements of the wireless device 202, other components may be used to implement one or more of the steps described herein.

At block 2305, a discovery packet may be received from a first device during a first discovery interval of a plurality of discovery intervals. The discovery packet may be configured to advertise one or more services provided by the first device. The plurality of discovery intervals may include recurring time intervals when multiple devices are configured to transmit and receive discovery packets. The receiving may be performed by receiver 212, for example.

At block 2310, a paging packet may be transmitted to the first device during a first paging interval of a plurality of paging intervals. The paging packet may be configured to indicate interest in at least one of the services provided by the first device. The plurality of paging intervals may include recurring time intervals when the multiple devices are configured to transmit and receive paging packets. The transmission may be performed by the transmitter 214, for example.

Figure 24:
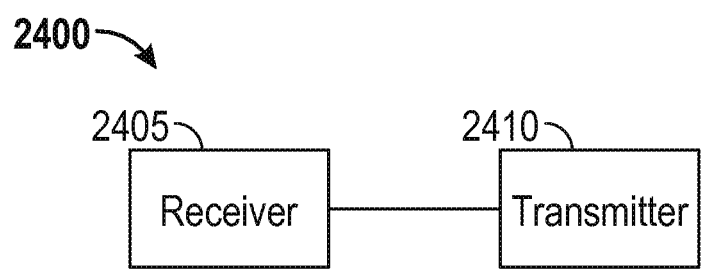
FIG. 24 is a functional block diagram of an exemplary wireless device that may be employed within the wireless communication system of FIG. 1.

FIG. 24 is a functional block diagram of an exemplary wireless device 2400 that may be employed within the wireless communication system of FIG. 1. The wireless device 2400 may include a receiver 2405 for receiving a discovery packet from a first device during a first discovery interval. The receiver 2405 may be configured to perform one or more functions discussed above with respect to block 2305 of FIG. 23. The receiver 2405 may correspond to the receiver 212. The wireless device 2400 may further include a transmitter 2410 configured to transmit a paging request packet to the first device during a first paging interval. The transmitter 2410 may be configured to perform one or more functions discussed above with respect to block 2310 of FIG. 23. The transmitter 2410 may correspond to transmitter 210.

Moreover, in one aspect, means for receiving a discovery packet from a first device during a first discovery interval may comprise the receiver 2405. In another aspect, means for transmitting a paging request packet to the first device during a first paging interval may comprise the transmitter 2410.

Figure 25:
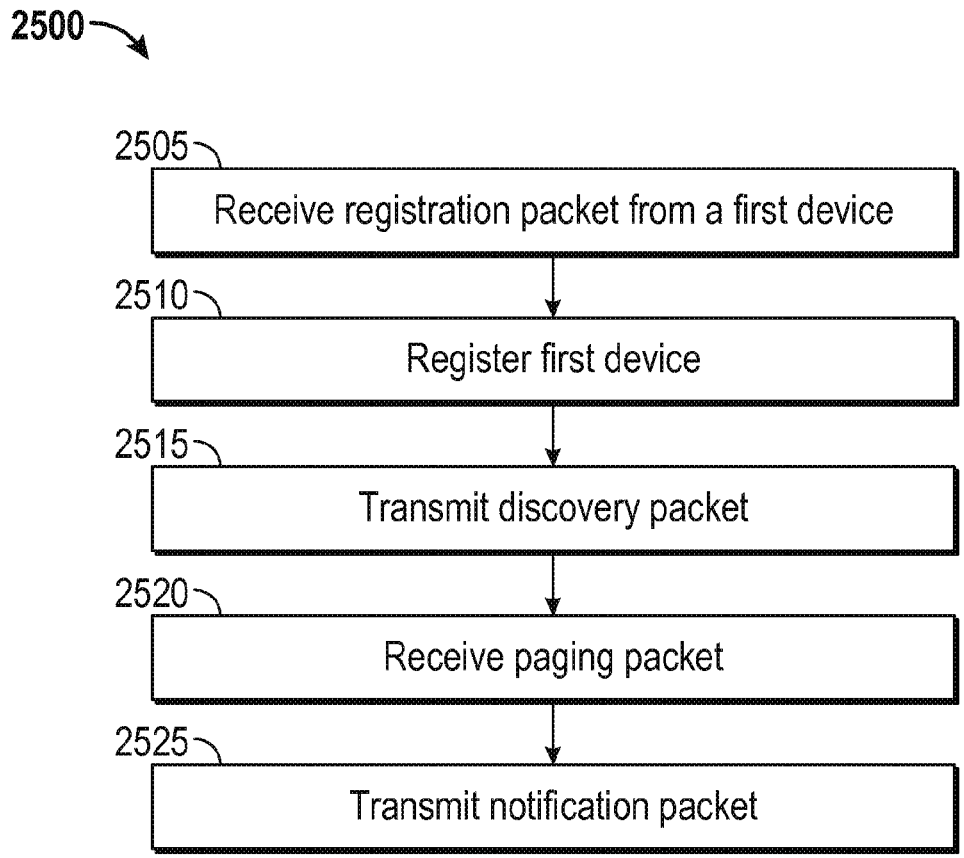
FIG. 25 is a flowchart of an exemplary process of discovering devices in a wireless communication system using an access point in accordance with aspects of the present disclosure.

FIG. 25 is a flowchart of an exemplary process 2500 of discovering devices in a wireless communication system using an access point in accordance with aspects of the present disclosure. The process 2500 may be used to introduce two devices as discussed in the description of FIG. 9, for example. Although the process 2500 is described below with respect to the elements of the wireless device 202, other components may be used to implement one or more of the steps described herein.

At block 2505, a registration packet may be received from a first device at an access point. The registration request packet may be configured to enable the access point to transmit a discovery packet. The discovery packet may be configured to advertise one or more services provided by the first device in a wireless communications network. The receiving may be performed by receiver 212, for example.

At block 2510, the first device may be registered at the access point based on the registration packet. The registration process may be completed using processor unit 204, and the registration information may be stored in memory 206, for example.

At block 2515, a discovery packet may be transmitted from the access point during a first discovery interval of a plurality of discovery intervals. The plurality of discovery intervals may include recurring time intervals when multiple devices are configured to transmit and receive discovery packets. The transmission may be performed by the transmitter 214, for example.

At block 2520, a paging packet may be received from a second device at the access point during a first paging interval of a plurality of paging intervals. The paging request packet may be configured to indicate interest in at least one of the services provided by the first device. The plurality of paging intervals may include recurring time intervals when the multiple devices are configured to transmit and receive paging packets. The plurality of paging intervals may not overlap with the plurality of discovery intervals. The receiving may be performed by receiver 212, for example.

At block 2525, a notification packet may be transmitted from the access point. The notification packet may be configured to enable the first device and the second device to communicate directly. The transmission may be performed by the transmitter 214, for example.

Figure 26:
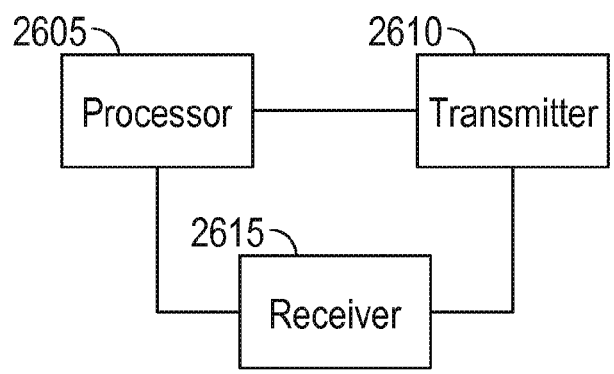
FIG. 26 is a functional block diagram of an exemplary wireless device that may be employed within the wireless communication system of FIG. 1.

FIG. 26 is a functional block diagram of an exemplary wireless device 2600 that may be employed within the wireless communication system of FIG. 1. The wireless device 2600 may include a processor 2605 configured to register the first device based on the registration packet. The processor 2605 may be configured to perform one or more functions discussed above with respect to block 2510 of FIG. 25. The processor 2605 may correspond to the processor unit 204. The wireless device 2600 may further include a transmitter 2610 configured to transmit the discovery packet during a first discovery interval and transmit a notification packet configured to enable the first device and the second device to communicate directly. The transmitter 2610 may be configured to perform one or more functions discussed above with respect to blocks 2515 and 2525 of FIG. 25. The transmitter 2610 may correspond to transmitter 210. The wireless device 2600 may further include a receiver 2615 configured to receive a registration request packet from a first device and a paging request packet from a second device at the access point during a first paging interval. The receiver 2615 may be configured to perform one or more functions discussed above with respect to blocks 2505 and 2520 of FIG. 25. The receiver 2615 may correspond to receiver 212.

Moreover, in one aspect, means for receiving a registration packet from a first device and receiving a paging request from a second device during a first paging interval may comprise the receiver 2615. In another aspect, means for registering the first device based on the registration request packet may comprise the processor 2605. In yet another aspect, means for transmitting the discovery packet during a first discovery interval and transmitting a notification packet configured to enable the first device and the second device to communicate directly may comprise the transmitter 2610.

Figure 27:
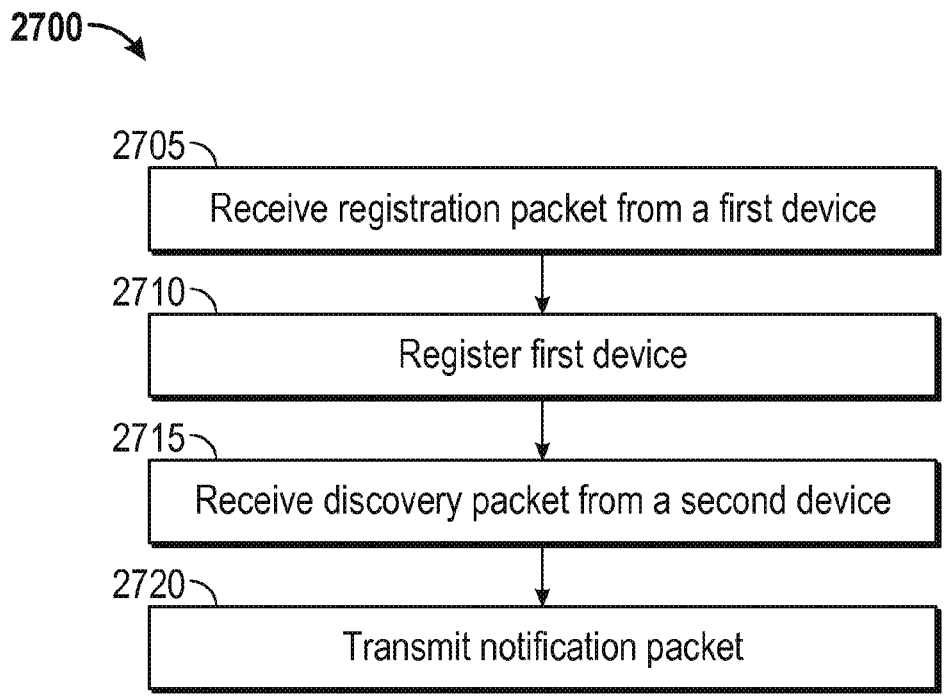
FIG. 27 is a flowchart of an exemplary process of discovering devices in a wireless communication system using an access point in accordance with aspects of the present disclosure.

FIG. 27 is a flowchart of an exemplary process 2700 of discovering devices in a wireless communication system using an access point in accordance with aspects of the present disclosure. The process 2700 may be used to introduce two devices as discussed in the description of FIG. 9, for example. Although the process 2700 is described below with respect to the elements of the wireless device 202, other components may be used to implement one or more of the steps described herein.

At block 2705, a registration request packet may be received from a first device at an access point. The registration request packet may be configured to indicate interest in at least one of the services provided by another device in a wireless communications network. The receiving may be performed by receiver 212, for example.

At block 2710, the first device may be registered at the access point based on the registration request packet. The registration process may be completed using processor unit 204, and the registration information may be stored in memory 206, for example.

At block 2715, a discovery packet may be received from a second device at the access point during a first discovery interval. The discovery packet may be configured to advertise one or more services provided by the second device. The plurality of discovery intervals may include recurring time intervals when multiple devices are configured to transmit and receive discovery packets. The receiving may be performed by receiver 212, for example.

At block 2720, a notification packet may be transmitted from the access point. The notification packet may be configured to enable the first device and the second device to communicate directly. The transmission may be performed by the transmitter 214, for example.

Figure 28:
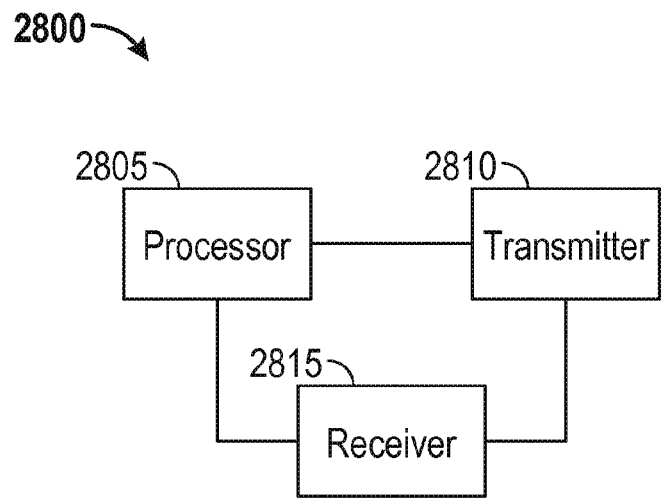
FIG. 28 is a functional block diagram of an exemplary wireless device that may be employed within the wireless communication system of FIG. 1.

FIG. 28 is a functional block diagram of an exemplary wireless device that may be employed within the wireless communication system of FIG. 1. The wireless device 2800 may include a processor 2805 configured to register the first device based on the registration packet. The processor 2805 may be configured to perform one or more functions discussed above with respect to block 2710 of FIG. 27. The processor 2805 may correspond to the processor unit 204. The wireless device 2800 may further include a transmitter 2810 configured to transmit a notification packet configured to enable the first device and the second device to communicate directly. The transmitter 2810 may be configured to perform one or more functions discussed above with respect to block 2720 of FIG. 27. The transmitter 2810 may correspond to transmitter 210. The wireless device 2800 may further include a receiver 2815 configured to receive a registration request packet from a first device and a discovery packet from a second device during a first discovery interval of a plurality of discovery intervals. The plurality of discovery intervals may include recurring time intervals when multiple devices are configured to transmit and receive discovery packets. The receiver 2815 may be configured to perform one or more functions discussed above with respect to blocks 2705 and 2715 of FIG. 27. The receiver 2815 may correspond to receiver 212.

Moreover, in one aspect, means for receiving a registration packet from a first device and receiving a discovery packet from a second device during a discovery interval may comprise the receiver 2815. In another aspect, means for registering the first device based on the registration request packet may comprise the processor 2805. In yet another aspect, means for transmitting a notification packet configured to enable the first device and the second device to communicate directly may comprise the transmitter 2810.

Figure 29:
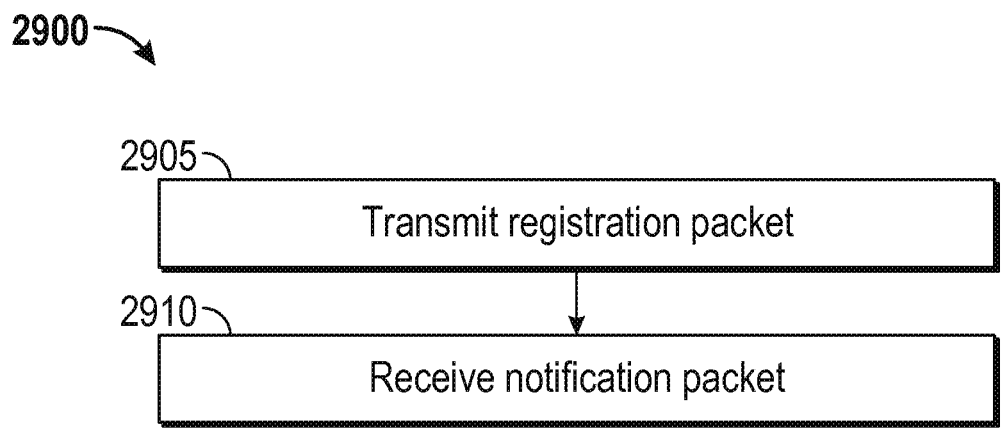
FIG. 29 is a flowchart of an exemplary process of discovering devices in a wireless communication system using an access point in accordance with aspects of the present disclosure.

FIG. 29 is a flowchart of an exemplary process 2900 of discovering devices in a wireless communication system using an access point in accordance with aspects of the present disclosure. The process 2900 may be used to introduce two devices as discussed in the description of FIG. 9, for example. Although the process 2900 is described below with respect to the elements of the wireless device 202, other components may be used to implement one or more of the steps described herein.

At block 2905, a registration request packet may be transmitted from a first device to an access point. The registration request packet may be configured to register the first device at the access point and enable the access point to transmit a discovery packet during a first discovery interval of a plurality of discovery intervals. The discovery packet may be configured to advertise one or more services provided by the first device. The plurality of discovery intervals may include recurring time intervals when multiple devices are configured to transmit and receive discovery packets. Further, the registration packet may be configured to register the first device at the access point and indicate interest in one or more services provided by a different device. The transmission may be performed by the transmitter 214, for example.

At block 2910, a notification packet may be received from the access point or a second device. The notification packet may be configured to indicate interest in at least one of the services provided by the first device and enable the first device and the second device to communicate directly. Further, the notification packet may be configured to indicate that the second device provides at least one service indicated of interest to the first device based on the registration packet. The receiving may be performed by receiver 212, for example.

Figure 30:
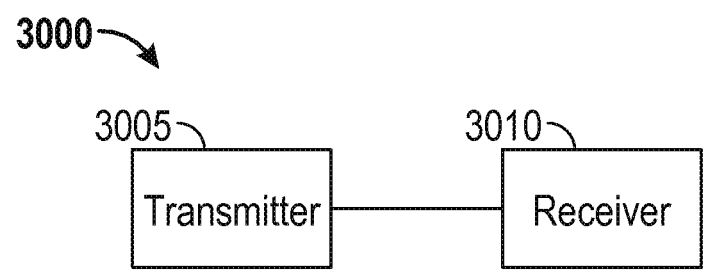
FIG. 30 is a functional block diagram of an exemplary wireless device that may be employed within the wireless communication system of FIG. 1.

FIG. 30 is a functional block diagram of an exemplary wireless device 3000 that may be employed within the wireless communication system of FIG. 1. The wireless device 3000 may include a transmitter 3005 for transmitting a registration packet from a first device to an access point. The transmitter 3005 may be configured to perform one or more functions discussed above with respect to block 2905 of FIG. 29. The transmitter 3005 may correspond to the transmitter 210. The wireless device 3000 may further include a receiver 3010 configured to receive from the access point or a second device a notification packet configured to indicate interest in at least one of the services provided by the first device or that the second device provides at least one service indicated of interest to the first device based on the registration packet. In addition, the notification packet may enable the first device and the second device to communicate directly. The receiver 3010 may be configured to perform one or more functions discussed above with respect to block 2910 of FIG. 29. The receiver 3010 may correspond to receiver 212.

Moreover, in one aspect, means for transmitting a registration request packet to an access point may comprise the transmitter 3005. In another aspect, means for receiving from the access point or a second device a notification packet may comprise the receiver 3010.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication performed by an apparatus, the method comprising:

receiving an indication of a first start time for a first discovery interval of a plurality of discovery intervals, a first duration for the first discovery interval, a second start time for a first paging interval of a plurality of paging intervals, and a second duration for the first paging interval;

transmitting a discovery packet during the first discovery interval of the plurality of discovery intervals, the discovery packet advertising a service provided in a wireless communications network, the plurality of discovery intervals comprising recurring time intervals when a plurality of devices are configured to transmit and receive discovery packets, the plurality of devices being aware of the first start time and the first duration; and receiving a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

2. The method of claim 1, wherein the discovery packet is configured to advertise a first service provided by the apparatus, and the paging packet is configured to indicate interest in the first service provided by the apparatus.

3. The method of claim 2, further comprising:
determining when to transmit the discovery packet based on contention for a wireless communication medium; and
delaying the contention until after a delay period determined based at least in part on a random value.

4. The method of claim 2, wherein the apparatus is configured to enter a power-save mode at times other than the plurality of discovery intervals and the plurality of paging intervals unless the apparatus is scheduled to communicate at times other than the plurality of discovery intervals and the plurality of paging intervals.

5. The method of claim 2, wherein said transmitting the discovery packet during the first discovery interval comprises transmitting the discovery packet during a first sub-interval of a plurality of sub-intervals of the first discovery interval, each sub-interval being of a same duration that is known by the plurality of devices.

6. The method of claim 5, further comprising determining the first sub-interval based on contention for a wireless communication medium.

7. The method of claim 5, further comprising determining the first sub-interval based on a scheduled sub-interval received from another device.

8. The method of claim 2, wherein said receiving the paging packet from the first device during the first paging interval comprises receiving the paging packet during a scheduled sub-interval of a plurality of sub-intervals of the first paging interval, each sub-interval being of a same duration that is known by the plurality of devices.

9. The method of claim 2, wherein the discovery packets transmitted during the plurality of discovery intervals have a fixed size and comprise at least one of a data frame, a management frame, and a management action frame.

10. The method of claim 9, wherein the discovery packets transmitted during the plurality of discovery intervals comprise a timestamp field configured to enable the plurality of devices to synchronize clocks.

11. The method of claim 2, wherein the discovery packets transmitted during the plurality of discovery intervals include discovery information generated by a higher layer discovery protocol or an application-based discovery protocol.

12. The method of claim 2, wherein the paging packets transmitted during the plurality of paging intervals have a fixed size and comprise a source address field and a recipient address field.

13. The method of claim 2, wherein a wireless communication medium is cleared of transmissions other than discovery packets during the plurality of discovery intervals, and the wireless communication medium is cleared of transmissions other than paging packets during the plurality of paging intervals.

14. The method of claim 13, further comprising transmitting a packet comprising a clear to send frame to clear the wireless communication medium of transmissions other than discovery packets during the first discovery interval and indicate a start of the first discovery interval.

15. The method of claim 1, further comprising:
receiving a registration packet from a second device, the registration packet configured to enable the apparatus to transmit the discovery packet, the discovery packet configured to advertise a first service provided by the second device; and
transmitting a notification packet configured to enable the first device and the second device to communicate directly,
wherein the paging packet is configured to indicate interest in the first service provided by the second device.

16. The method of claim 15, further comprising:
transmitting a power-save message configured to instruct the first device to enter a power-save mode; and
transmitting an awaken message configured to instruct the first device to leave a power-save mode, the awaken message comprising a traffic indication message.

17. The method of claim 15, wherein said transmitting the notification packet comprises transmitting the notification packet to the first device.

18. The method of claim 17, wherein the notification packet comprises a page forward frame configured to forward the paging packet received from the second device.

19. The method of claim 15, wherein said transmitting the notification packet comprises transmitting the notification packet to the second device.

20. A method of discovering devices in a wireless communication system performed by an apparatus, the method comprising:
receiving an indication of a first start time for a first discovery interval of a plurality of discovery intervals, a first duration for the first discovery interval, a second start time for a first paging interval of a plurality of paging intervals, and a second duration for the first paging interval;
receiving a discovery packet from a first device during the first discovery interval of the plurality of discovery intervals, the discovery packet advertising a service provided by the first device in a wireless communications network, the plurality of discovery intervals comprising recurring time intervals when a plurality of devices are configured to transmit and receive discovery packets, the plurality of devices being aware of the first start time and the first duration; and
transmitting a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

21. The method of claim 20, further comprising:
determining when to transmit the paging packet based on contention for a wireless communication medium; and
delaying the contention until after a delay time determined based at least in part on a random value.

22. The method of claim 20, wherein the apparatus is configured to enter a power-save mode at times other than the plurality of discovery intervals and the plurality of paging intervals unless the apparatus is scheduled to communicate at times other than the plurality of discovery intervals and the plurality of paging intervals.

23. The method of claim 20, wherein said receiving the discovery packet during the first discovery interval comprises receiving the discovery packet during a first scheduled sub-interval of a plurality of sub-intervals of the first discovery interval, each sub-interval being of a same time duration that is known by the plurality of devices.

24. The method of claim 20, wherein said transmitting the paging packet to the first device during the first paging interval comprises transmitting the paging packet during a first sub-interval of a plurality of sub-intervals of the first paging interval, each sub-interval being of a same time duration that is known by the plurality of devices.

25. The method of claim 24, further comprising determining the first sub-interval based on contention for a wireless communication medium.

26. The method of claim 24, further comprising determining the first sub-interval based on a scheduled sub-interval received from another device.

27. The method of claim 20, wherein the discovery packets transmitted during the plurality of discovery intervals have a fixed size and comprise at least one of a data frame, a management frame, and a management action frame.

28. The method of claim 20, wherein the discovery packet from the first device indicates a start of the first paging interval.

29. The method of claim 20, wherein the discovery packet includes discovery information generated by a higher layer discovery protocol or an application-based discovery protocol.

30. The method of claim 20, wherein the paging packets transmitted during the plurality of paging intervals have a fixed size and comprise a source address field and a recipient address field.

31. The method of claim 20, wherein a wireless communication medium is cleared of transmissions other than discovery packets during the plurality of discovery intervals, and the wireless communication medium is cleared of transmissions other than paging packets during the plurality of paging intervals.

32. An apparatus operable in a wireless communication system comprising:
   a transmitter configured to transmit a discovery packet during a first discovery interval of a plurality of discovery intervals, the discovery packet advertising a service provided in a wireless communications network, the plurality of discovery intervals comprising recurring time intervals when a plurality of devices are configured to transmit and receive discovery packets, the plurality of devices being aware of a first start time for the first discovery interval and a first duration for the first discovery interval; and
   a receiver configured to receive an indication of the first start time, the first duration, a second start time for the first paging interval, and a second duration for the first paging interval, and receive a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of devices being aware of a second start time for the first paging interval and a second duration for the first paging interval, the plurality of paging intervals not overlapping the plurality of discovery intervals.

33. The apparatus of claim 32, wherein the discovery packet is configured to advertise a first service provided by the apparatus, and the paging packet is configured to indicate interest in the first service provided by the apparatus.

34. The apparatus of claim 33, further comprising a processor configured to:
   determine when to transmit the discovery packet based on contention for a wireless communication medium; and
   delay the contention until after a delay period determined based at least in part on a random value.

35. The apparatus of claim 33, wherein the apparatus is configured to enter a power-save mode at times other than the plurality of discovery intervals and the plurality of paging intervals unless the apparatus is scheduled to communicate at times other than the plurality of discovery intervals and the plurality of paging intervals.

36. The apparatus of claim 33, wherein the transmitter is configured to transmit the discovery packet during a first sub-interval of a plurality of sub-intervals of the first discovery interval, each sub-interval being of a same duration that is known by the plurality of devices.

37. The apparatus of claim 36, further comprising a processor configured to determine the first sub-interval based on contention for a wireless communication medium.

38. The apparatus of claim 36, further comprising a processor configured to determine the first sub-interval based on a scheduled sub-interval received from another device.

39. The apparatus of claim 33, wherein the receiver is configured to receive the paging packet during a scheduled sub-interval of a plurality of sub-intervals of the first paging interval, each sub-interval being of a same time duration that is known by the plurality of devices.

40. The apparatus of claim 33, wherein the discovery packets transmitted during the plurality of discovery intervals have a fixed size and comprise at least one of a data frame, a management frame, and a management action frame.

41. The apparatus of claim 40, wherein the discovery packets transmitted during the plurality of discovery intervals comprise a timestamp field configured to enable the plurality of devices to synchronize clocks.

42. The apparatus of claim 40, wherein the discovery packets transmitted during the plurality of discovery intervals include discovery information generated by a higher layer discovery protocol or an application-based discovery protocol.

43. The apparatus of claim 33, wherein the paging packets transmitted during the plurality of paging intervals have a fixed size and comprise a source address field and a recipient address field.

44. The apparatus of claim 33, wherein a wireless communication medium is cleared of transmissions other than discovery packets during the plurality of discovery intervals, and the wireless communication medium is cleared of transmissions other than paging packets during the plurality of paging intervals.

45. The apparatus of claim 44, wherein the transmitter is further configured to transmit a packet comprising a clear to send frame to clear the wireless communication medium of transmissions other than discovery packets during the first discovery interval and indicate a start of the first discovery interval.

46. The apparatus of claim 32, wherein
   the receiver is further configured to receive a registration packet from a second device, the registration packet configured to enable the apparatus to transmit the discovery packet, the discovery packet configured to advertise a first service provided by the second device; and
   the transmitter is further configured to transmit a notification packet configured to enable the first device and the second device to communicate directly, wherein the paging packet is configured to indicate interest in the first service provided by the second device.

47. The apparatus of claim 46, further comprising:
transmitting a power-save message configured to instruct the first device to enter a power-save mode; and
transmitting an awaken message configured to instruct the first device to leave a power-save mode, the awaken message comprising a traffic indication message.

48. The method of claim 46, wherein said transmitting the notification packet comprises transmitting the notification packet to the first device.

49. The method of claim 48, wherein the notification packet comprises a page forward frame configured to forward the paging packet received from the second device.

50. The method of claim 46, wherein said transmitting the notification packet comprises transmitting the notification packet to the second device.

51. An apparatus operable in a wireless communication system comprising:
a receiver configured to receive an indication of a first start time for a first discovery interval of a plurality of discovery intervals, a first duration for the first discovery interval, a second start time for a first paging interval of a plurality of paging intervals, and a second duration for the first paging interval, and receive a discovery packet from a first device during the first discovery interval of the plurality of discovery intervals, the discovery packet advertising a service provided by the first device in a wireless communications network, the plurality of discovery intervals comprising recurring time intervals when a plurality of devices are configured to transmit and receive discovery packets, the plurality of devices being aware of the first start time and the first duration; and
a transmitter configured to transmit a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

52. The apparatus of claim 51, further comprising processor configured to:
determine when to transmit the paging packet based on contention for a wireless communication medium; and
delay the contention until after a delay time determined based at least in part on a random value.

53. The apparatus of claim 51, wherein the apparatus is configured to enter a power-save mode at times other than the plurality of discovery intervals and the plurality of paging intervals unless the apparatus is scheduled to communicate at times other than the plurality of discovery intervals and the plurality of paging intervals.

54. The apparatus of claim 51, wherein the receiver is configured to receive the discovery packet during a first scheduled sub-interval of a plurality of sub-intervals of the first discovery interval, each sub-interval being of a same time duration that is known by the plurality of devices.

55. The apparatus of claim 51, wherein the transmitter is configured to transmit the paging packet during a first sub-interval of a plurality of sub-intervals of the first paging interval, each sub-interval being of a same time duration that is known by the plurality of devices.

56. The apparatus of claim 55, further comprising a processor configured to determine the first sub-interval based on contention for a wireless communication medium.

57. The apparatus of claim 55, further comprising a processor configured to determine the first sub-interval based on a scheduled sub-interval received from another device.

58. The apparatus of claim 51, wherein the discovery packets transmitted during the plurality of discovery intervals have a fixed size and comprise at least one of a data frame, a management frame, and a management action frame.

59. The apparatus of claim 51, wherein the discovery packet from the first device indicates a start of the first paging interval.

60. The apparatus of claim 51, wherein the discovery packet includes discovery information generated by a higher layer discovery protocol or an application-based discovery protocol.

61. The apparatus of claim 51, wherein the paging packets transmitted during the plurality of paging intervals have a fixed size and comprise a source address field and a recipient address field.

62. The apparatus of claim 51, wherein a wireless communication medium is cleared of transmissions other than discovery packets during the plurality of discovery intervals, and the wireless communication medium is cleared of transmissions other than paging packets during the plurality of paging intervals.

63. An apparatus operable in a wireless communication system comprising:
means for receiving an indication of a first start time for a first discovery interval of a plurality of discovery intervals, a first duration for the first discovery interval, a second start time for a first paging interval of a plurality of paging intervals, and a second duration for the first paging interval;
means for transmitting a discovery packet during the first discovery interval of the plurality of discovery intervals, the discovery packet advertising a service provided in a wireless communications network, the plurality of discovery intervals comprising recurring time intervals when a plurality of devices are configured to transmit and receive discovery packets, the plurality of devices being aware of the first start time and the first duration; and
means for receiving a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

64. An apparatus operable in a wireless communication system comprising:
means for receiving an indication of a start time and a duration for a first discovery interval of a plurality of discovery intervals, the start time and the duration shared among a plurality of devices;
means for receiving a discovery packet from a first device during the first discovery interval of the plurality of discovery intervals, the discovery packet advertising a service provided by the first device in a wireless communications network, the plurality of discovery intervals comprising recurring time intervals when a plurality of devices are configured to transmit and receive discovery packets, the plurality of devices being aware of the first start time and the first duration; and means for transmitting a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

65. A non-transitory computer-readable medium comprising instructions that when executed cause an apparatus to:

receive an indication of a start time and a duration for a first discovery interval of a plurality of discovery intervals, the start time and the duration shared among a plurality of devices;

transmit a discovery packet during the first discovery interval of the plurality of discovery intervals, the discovery packet advertising a service provided in a wireless communications network, the plurality of discovery intervals comprising recurring time intervals when a plurality of devices are configured to transmit and receive discovery packets, the plurality of devices being aware of the first start time and the first duration; and receive a paging packet from a first device during a first paging interval of a plurality of paging intervals, the paging packet indicating interest in the service, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

66. A non-transitory computer-readable medium comprising instructions that when executed cause an apparatus to:

receive an indication of a start time and a duration for a first discovery interval of a plurality of discovery intervals, the start time and the duration shared among a plurality of devices;

receive a discovery packet from a first device during the first discovery interval of the plurality of discovery intervals, the discovery packet advertising a service provided by the first device in a wireless communications network, the plurality of discovery intervals comprising recurring time intervals when a plurality of devices are configured to transmit and receive discovery packets, the plurality of devices being aware of the first start time and the first duration; and transmit a paging packet to the first device during a first paging interval of a plurality of paging intervals, the paging packet indicating interest in the service provided by the first device, the plurality of paging intervals comprising recurring time intervals when the plurality of devices are configured to transmit and receive paging packets, the plurality of devices being aware of the second start time and the second duration, the plurality of paging intervals not overlapping the plurality of discovery intervals.

* * * * *